US009705880B2

(12) United States Patent
Siris

(10) Patent No.: US 9,705,880 B2
(45) Date of Patent: Jul. 11, 2017

(54) SYSTEMS, METHODS, AND COMPUTER PROGRAM PRODUCTS FOR DATA GOVERNANCE AND LICENSING

(71) Applicant: United Parcel Service of America, Inc., Atlanta, GA (US)

(72) Inventor: Marc Siris, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 515 days.

(21) Appl. No.: 13/782,686

(22) Filed: Mar. 1, 2013

(65) Prior Publication Data
US 2014/0250537 A1 Sep. 4, 2014

(51) Int. Cl.
*G06F 21/10* (2013.01)
*G06Q 10/08* (2012.01)
*H04L 29/06* (2006.01)
*G06Q 30/04* (2012.01)
*G06Q 30/06* (2012.01)

(52) U.S. Cl.
CPC ......... *H04L 63/10* (2013.01); *G06Q 10/0833* (2013.01)

(58) Field of Classification Search
CPC . G06F 21/10; G06F 21/6218; G06Q 10/0833; G06Q 10/083; G06Q 10/08; G06Q 30/04; G06Q 30/06
USPC ................................ 705/52, 59, 333; 726/28
See application file for complete search history.

(56) References Cited

U.S. PATENT DOCUMENTS

| | | | |
|---|---|---|---|
| 6,427,021 B1 * | 7/2002 | Fischer | G07B 17/00024 382/100 |
| 7,385,500 B2 | 6/2008 | Irwin | |
| 7,774,284 B2 | 8/2010 | Williams et al. | |
| 2003/0149674 A1 | 8/2003 | Good et al. | |
| 2003/0177074 A1 * | 9/2003 | Ramanathan | G06F 21/10 705/59 |
| 2005/0183143 A1 | 8/2005 | Anderholm et al. | |
| 2006/0116893 A1 | 6/2006 | Carnes et al. | |
| 2013/0006852 A1 * | 1/2013 | Demeyer | G06F 21/10 705/39 |
| 2014/0309018 A1 * | 10/2014 | Walker | G07F 17/32 463/25 |

* cited by examiner

*Primary Examiner* — Tae Kim
*Assistant Examiner* — Shiuh-Huei Ku
(74) *Attorney, Agent, or Firm* — Alston & Bird LLP

(57) ABSTRACT

Various embodiments provide a data governance and licensing system for monitoring usage of tracking data associated with transport of a plurality of packages and for facilitating licensing arrangements in connection therewith. In certain embodiments, the system comprises: one or more memory storage areas containing a variety of data and one or more computer processors. The one or more computer processors are configured to: receive observed data associated with access of tracking data by at least one accessing party; analyze at least a portion of the observed data to determine identification data for the accessing party; compare the identification data and the authorized user data to determine whether the accessing party is an authorized party; determine whether one or more discrepancies exist between the observed data and either generic usage data or authorized user data; and if so, generate either a license proposal or a license revision request.

22 Claims, 11 Drawing Sheets

SYSTEMS, METHODS, AND COMPUTER PROGRAM PRODUCTS FOR DATA GOVERNANCE AND LICENSING

BACKGROUND

Shipping carriers (e.g., common carriers, such as United Parcel Service, Inc. (UPS), FedEx, United States Postal Service (USPS), etc.) daily transport millions of packages over tens of thousands of routes to and from a variety of clients for different purposes. Generally, shipping carriers incorporate a plurality of tracking data and use a plurality of tracking assets so as to generate and document a plethora of information associated with the transport of these packages. The provision and use of this information by various parties associated with particular packages is extremely beneficial, not only for purposes of customer service, but also for efficiency and effectiveness across the shipping carrier's platform.

In existing configurations, multiple systems may be employed to monitor and analyze parameters associated with transport of a plurality of packages and provide reports thereon. Such systems further transmit any of a variety of collected and/or recorded data to any of a variety of parties, whether upon request or otherwise. However, such systems do not typically collect data regarding the data requesting party, for example, where access to data is directly requested. Those systems that do collect such data, typically do nothing further other than storing the same in one or more databases, conceivably for future retrieval, as may be necessary.

As a result, undocumented and/or previously unauthorized access or use of any portion of the plurality of tracking data, via the tracking assets associated systems or otherwise, represents, at best, an area of un- or under-capitalized revenue for shipping providers. At worst, undocumented and/or unauthorized data usage could further result in a loss of customers via, for example data mining by competitor shipping providers. Accordingly, a need exists for a consolidated system that not only monitors and tracks access and usage of package tracking data by a plurality of parties, but also manages the usage rights associated with the same so as to create an efficient and effective gating system configured to distinguish between authorized and unauthorized uses of such data and to proactively respond to deviations therefrom, as appropriate.

BRIEF SUMMARY

According to various embodiments of the present invention, a data governance and licensing system is provided for monitoring usage of tracking data associated with transport of a plurality of packages and for facilitating licensing arrangements in connection therewith. The system comprises: one or more memory storage areas containing tracking data related to one or more parameters associated with transport of a plurality of package, generic usage data, and authorized user data related to a plurality of authorized parties, the authorized parties comprising those parties authorized to access the tracking data; and one or more computer processors. The one or more computer processors are configured to: receive observed data associated with access of at least a portion of the tracking data by at least one accessing party; analyze at least a portion of the observed data to determine an identity of the accessing party, the determined identity being stored as identification data; compare the identification data and the authorized user data to determine whether the accessing party is an authorized party; in response to the accessing party not being an authorized party: determine whether one or more discrepancies exist between the observed data and the generic usage data; and in response to one or more discrepancies existing, generate a license proposal request; and in response to the accessing party being an authorized party: determine whether one or more discrepancies exist between the observed data and the authorized user data; and in response to one or more discrepancies existing, generate a license revision request.

According to various embodiments of the present invention, a computer program product is provided comprising at least one computer-readable storage medium having computer-readable program code portions embodied therein. The computer-readable program code portions comprise: (A) a first executable portion configured for receiving a plurality of data, wherein the data comprises: (i) tracking data related to one or more parameters associated with transport of a plurality of package, generic usage parameter data; and (ii) authorized user data related to a plurality of authorized parties, the authorized parties comprising those parties authorized to access the tracking data; (B) a second executable portion configured for analyzing at least a portion of the observed data to determine an identity of the accessing party, the determined identity being stored as identification data; (C) a third executable portion configured for comparing the identification data and the authorized user data to determine whether the accessing party is an authorized party; and (D) a fourth executable portion configured for: (i) in response to the accessing party not being an authorized party: determining whether one or more discrepancies exist between the observed data and the generic usage parameter data; and in response to one or more discrepancies existing, generating a license proposal request; and (ii) in response to the accessing party being an authorized party: determining whether one or more discrepancies exist between the observed data and the authorized user data; and in response to one or more discrepancies existing, generating a license revision request.

According to various embodiments of the present invention, a computer-implemented method is provided for managing governance and licensing of data related to transport of a plurality of packages and for facilitating licensing arrangements in connection therewith. Various embodiments of the method comprise the steps of: (A) receiving and storing observed data within one or more memory storage areas, the actual data being associated with access of at least a portion of the tracking data by at least one accessing party; (B) analyzing at least a portion of the observed data to determine an identity of the accessing party, the determined identity being stored as identification data; (C) retrieving from the one or more memory storage areas at least a portion of authorized user data related to a plurality of authorized parties, the authorized parties comprising those parties authorized to access the tracking data; (D) comparing, via at least one computer processor, the identification data and the retrieved portion of the authorized user data to determine whether the accessing party is an authorized party; (E) in response to the accessing party not being an authorized party: (i) retrieving from the one or more memory storage areas at least a portion of generic usage data; (ii) determining whether one or more discrepancies exist between the observed data and the generic usage data; and (iii) in response to one or more discrepancies existing, generating a license proposal request; and (F) in response to the accessing party being an authorized party: (i) retrieving from the one or more memory storage areas at least a portion of the authorized user data; (ii) determining whether one or more discrepancies exist between the observed data and the authorized user data; and (iii) in response to one or more discrepancies existing, generating a license revision request.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

Figure 2:
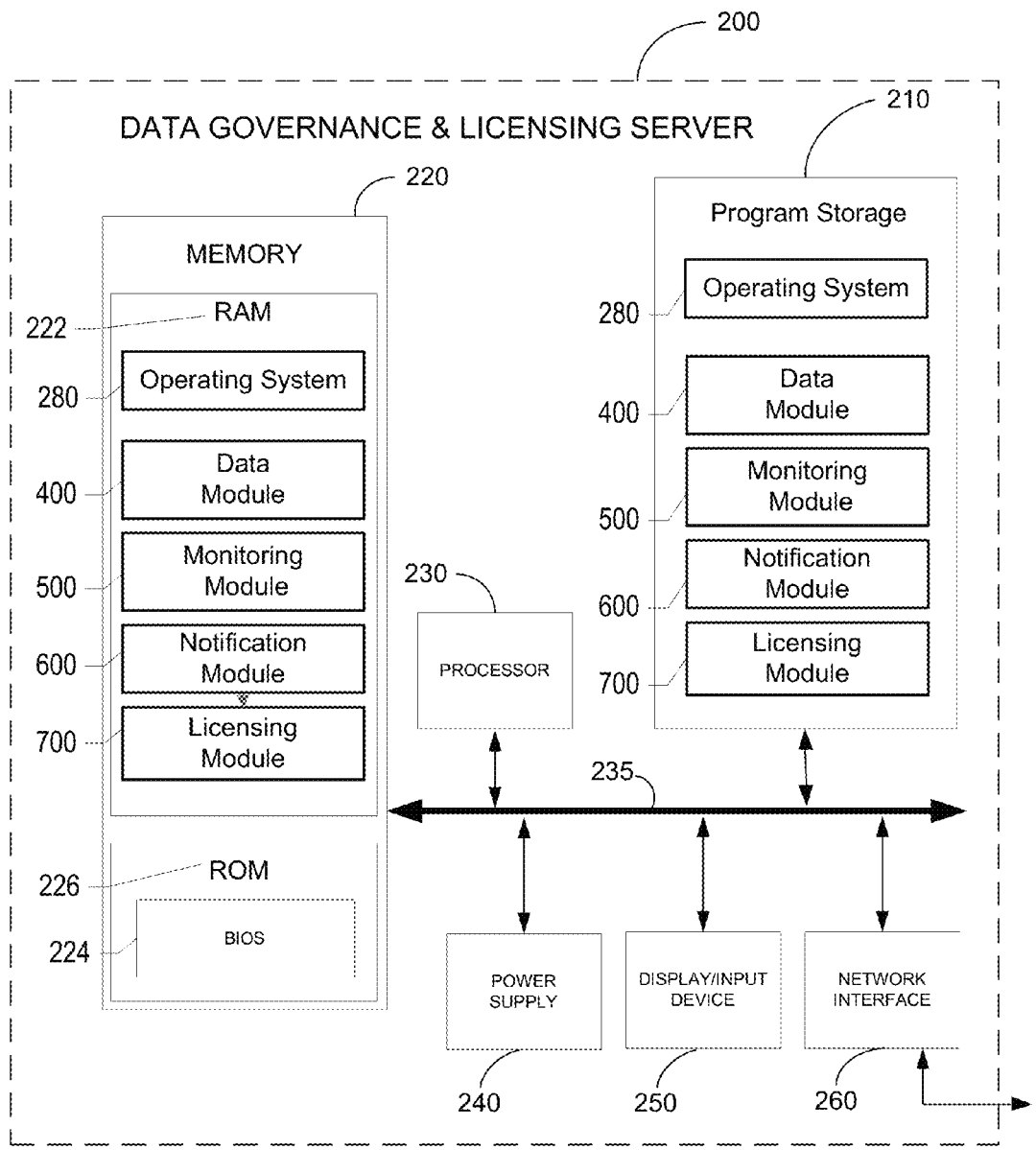
FIG. 2 is schematic block diagram of a DG&L server 200 according to various embodiments.
Figure 5:
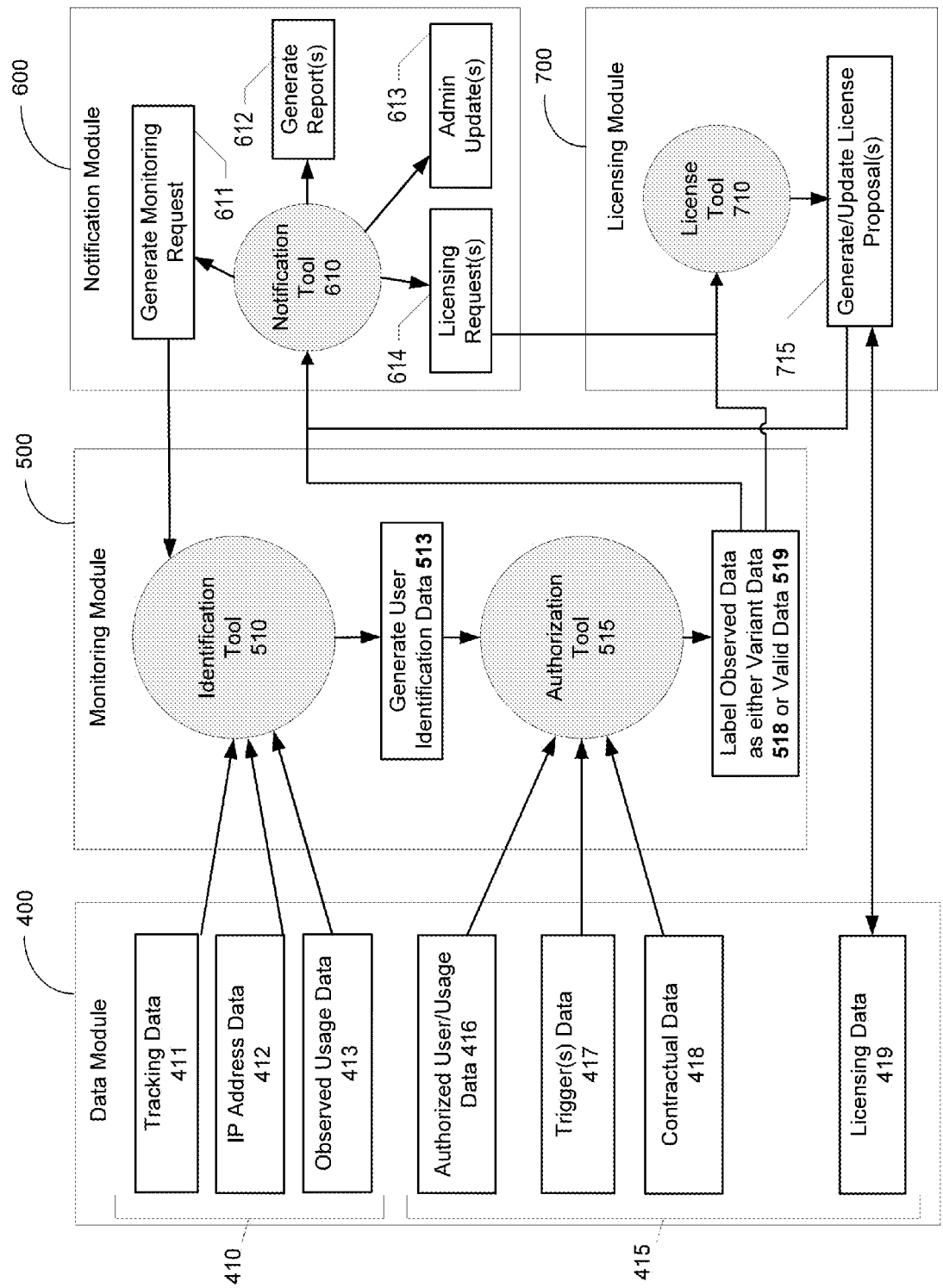
Figure 6:
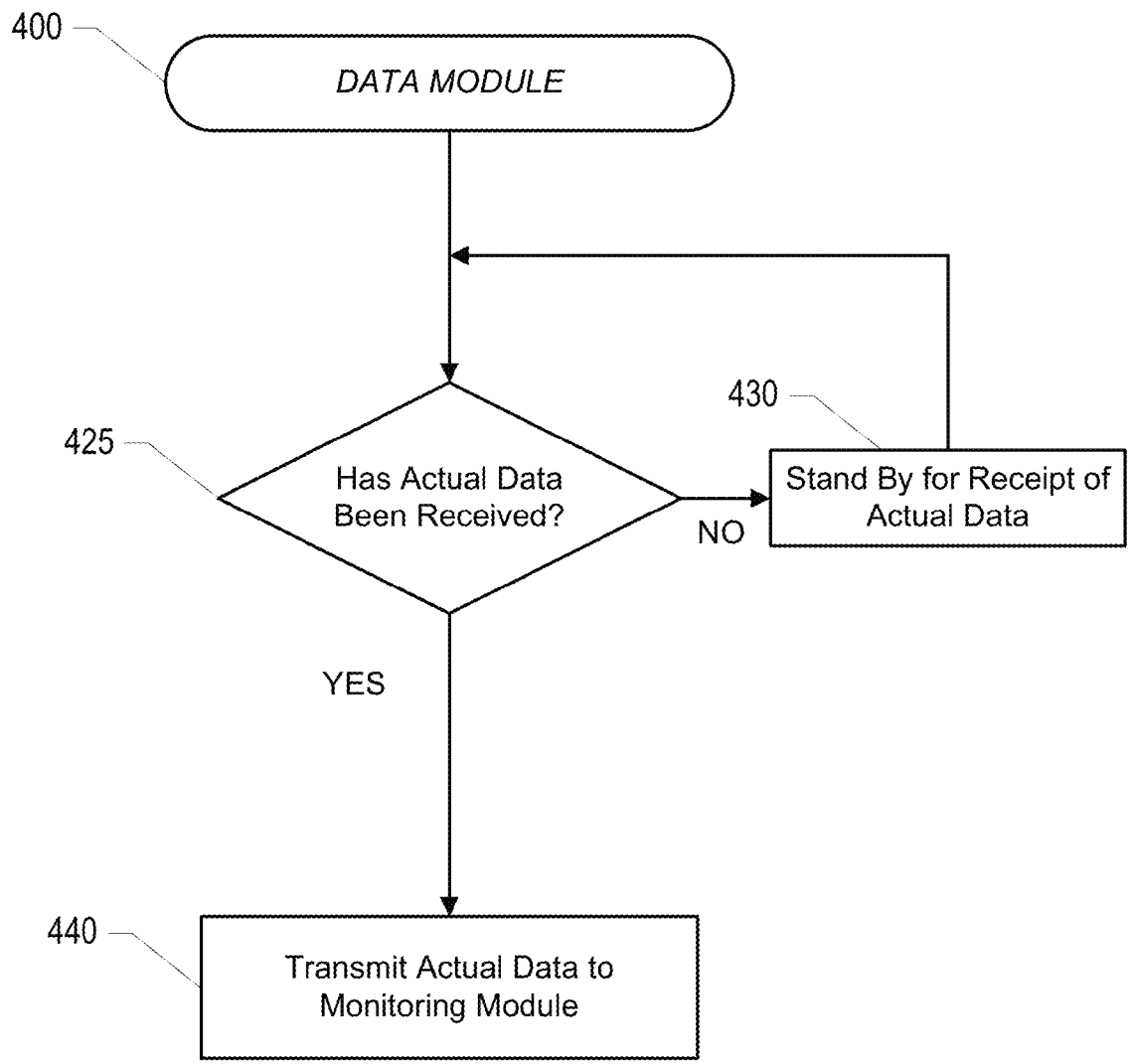
Figure 7:
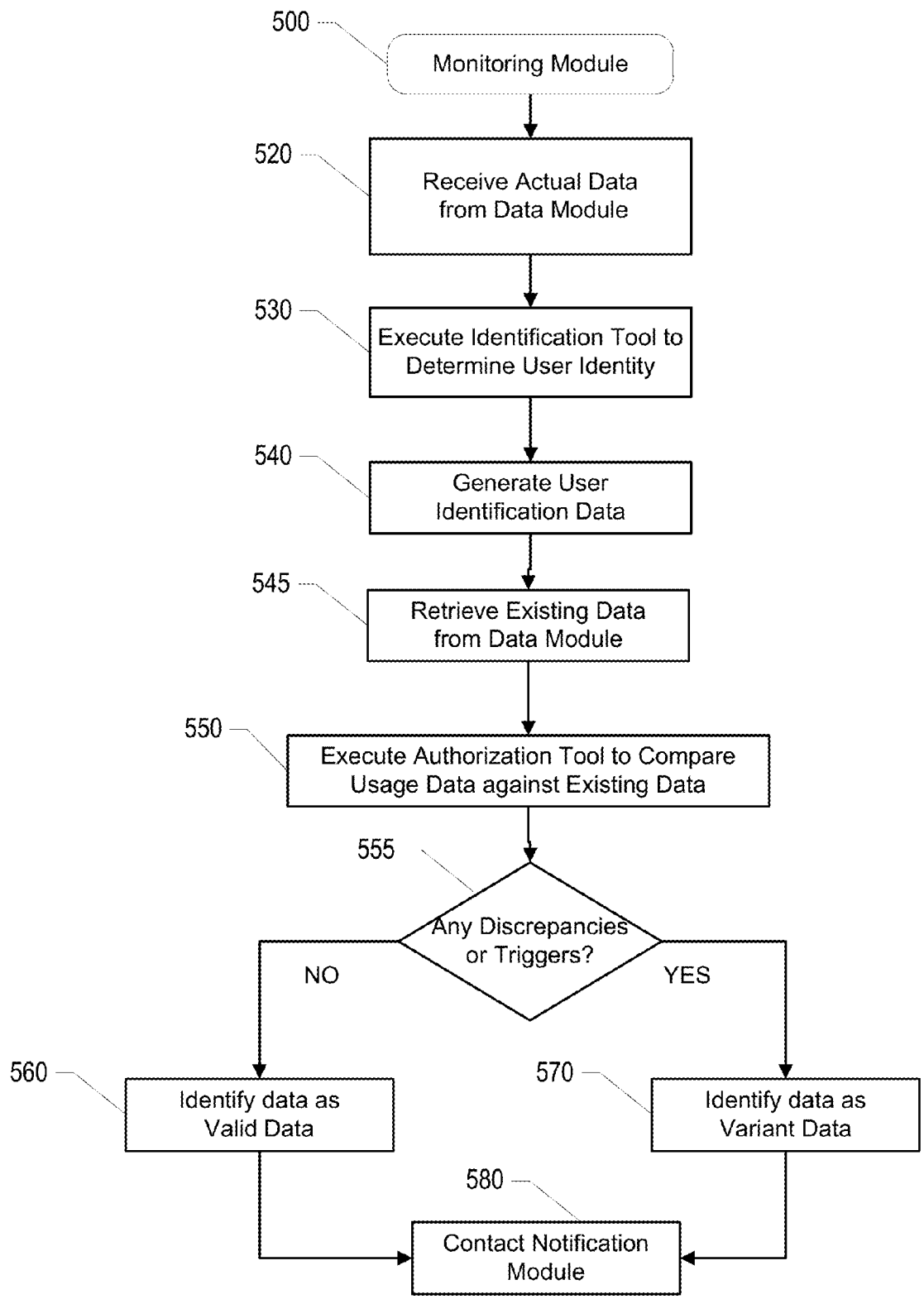
Figure 8:
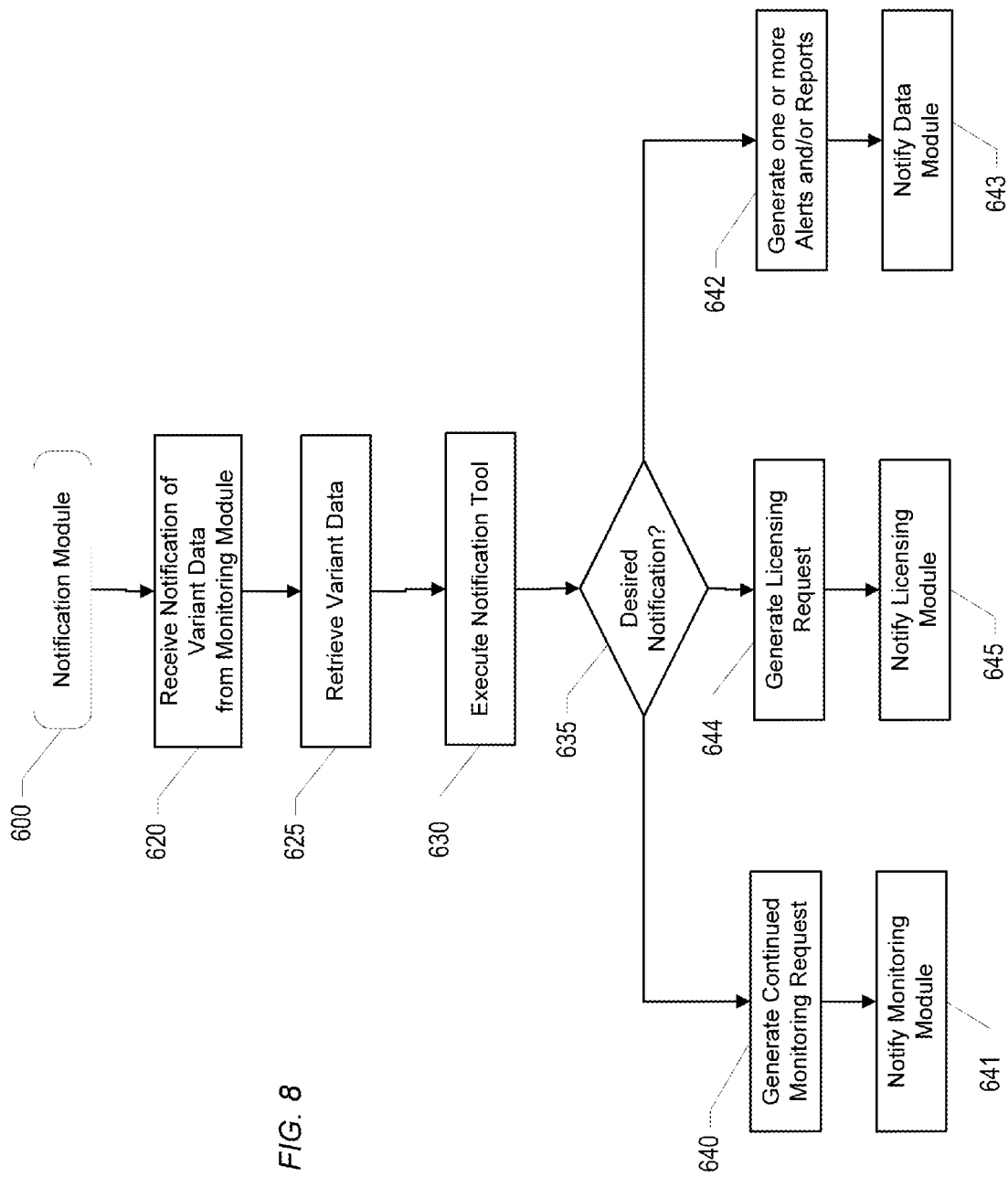
Figure 9:
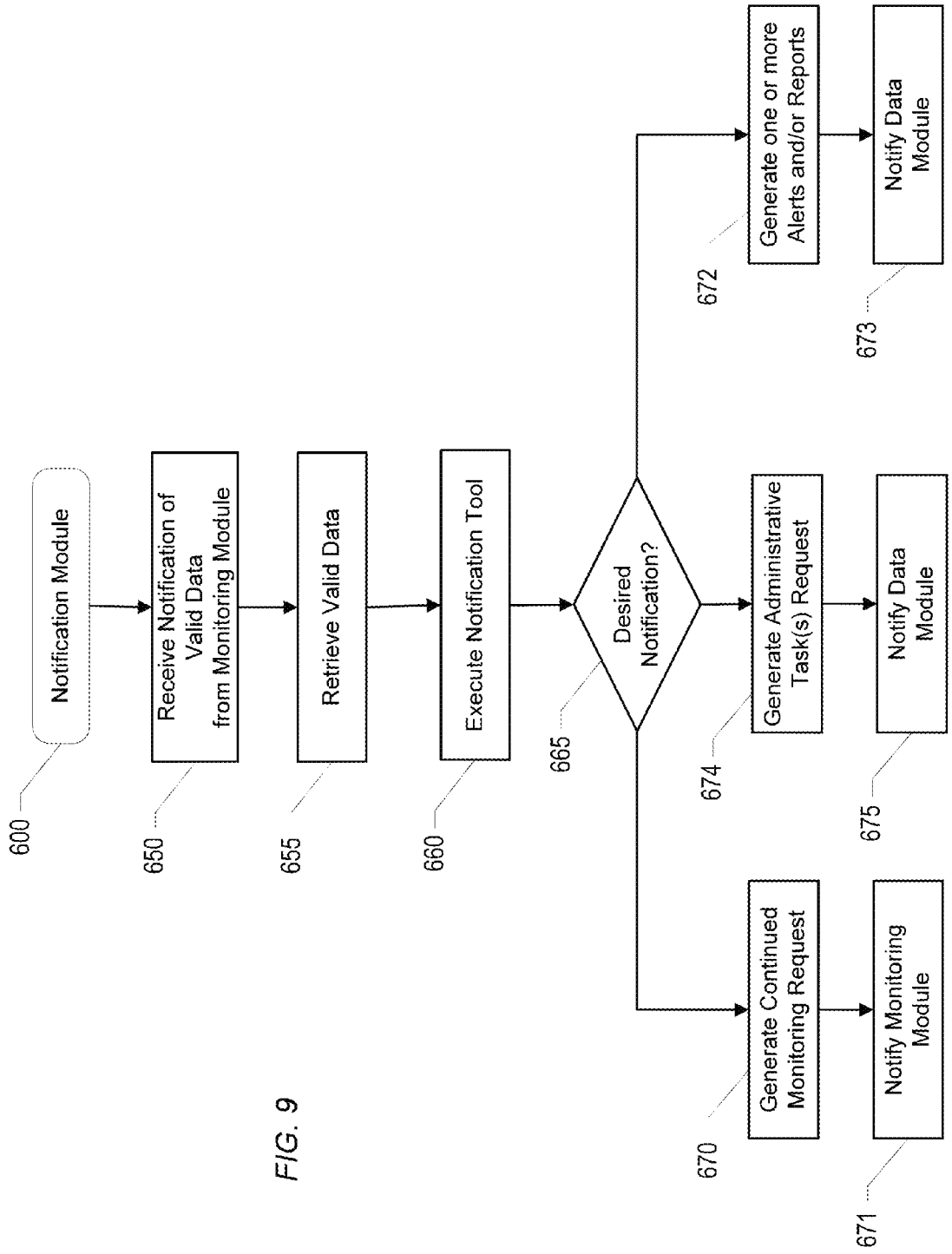
Figure 10:
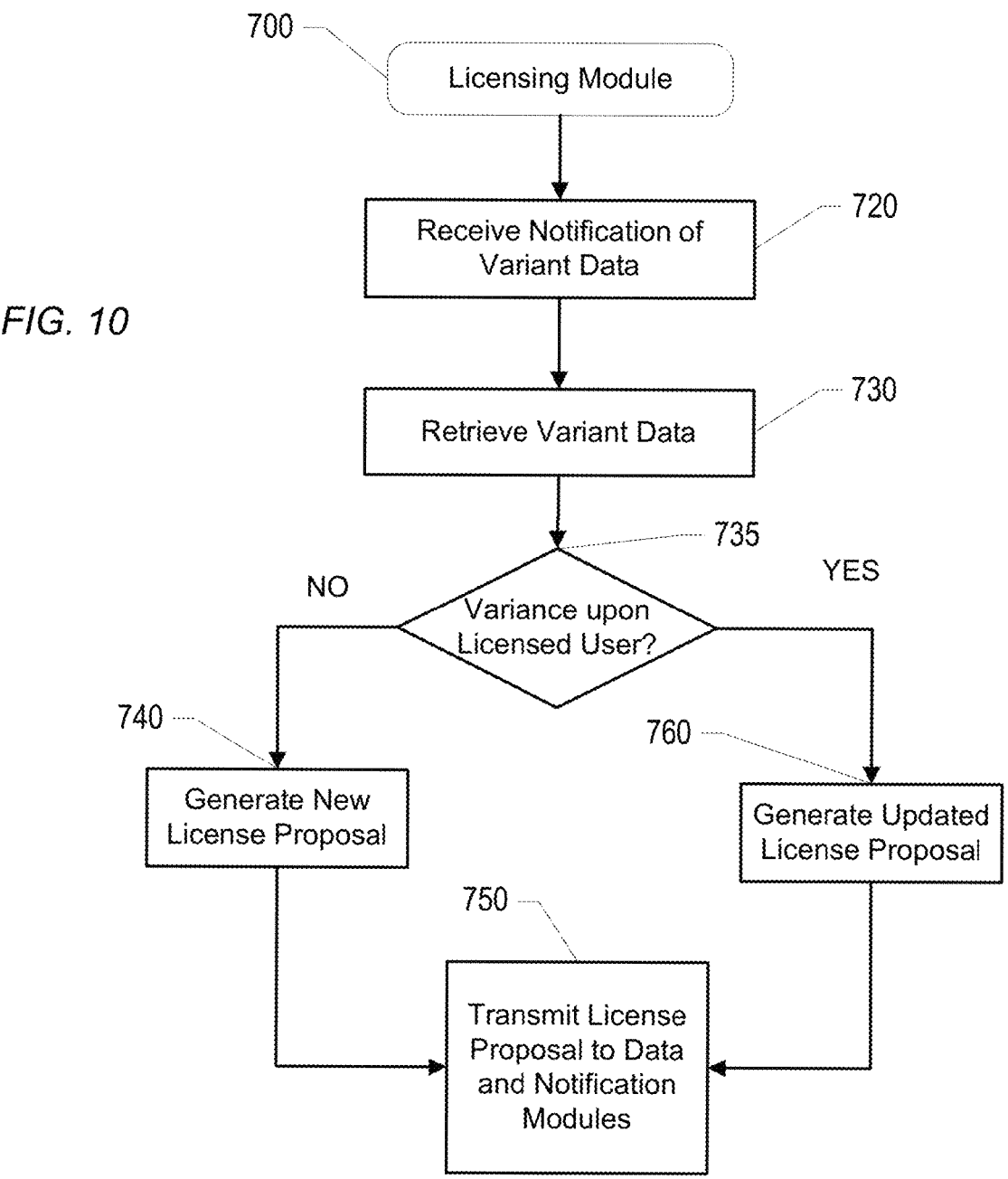
Figure 11:
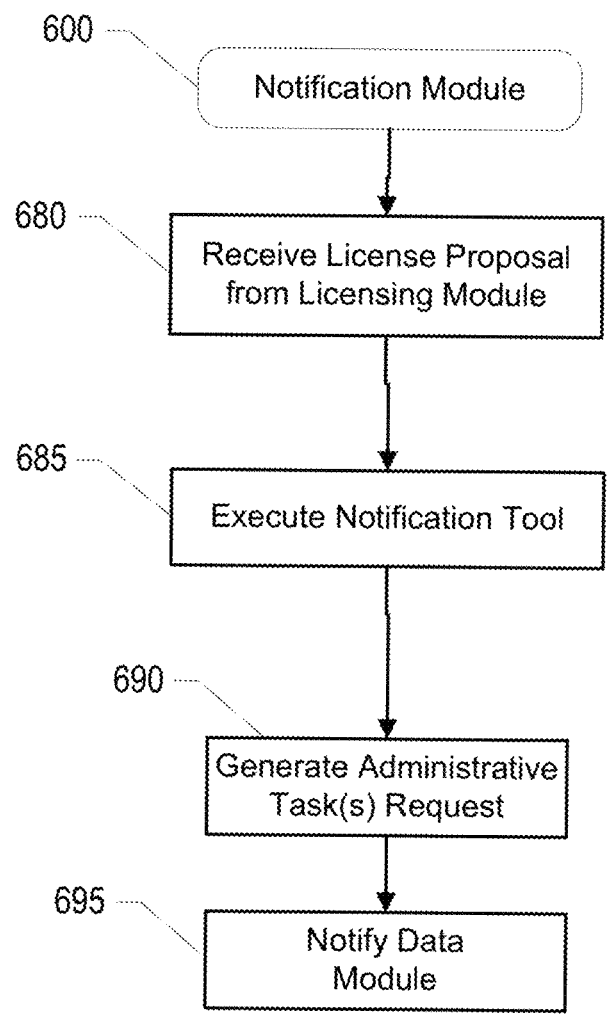

FIG. 5 is a schematic block diagram of a data module 400, a monitoring module 500, a notification module 600, and a licensing module 700, as also illustrated in FIG. 2 according to various embodiments;

FIG. 6 illustrates an exemplary process flow according to various embodiments for the data module 400 shown in FIGS. 2 and 5;

FIG. 7 illustrates an exemplary process flow according to various embodiments for the monitoring module 500 shown in FIGS. 2 and 5;

FIG. 8 illustrates a first exemplary process flow according to various embodiments for the notification module 600 shown in FIGS. 2 and 5;

FIG. 9 illustrates a second exemplary process flow according to various embodiments for the notification module 600 shown in FIGS. 2 and 5;

FIG. 10 illustrates an exemplary process flow according to various embodiments for the licensing module 700 shown in FIGS. 2 and 5; and FIG. 11 illustrates a third exemplary process flow according to various embodiments for the notification module 600 shown in FIGS. 2 and 5.

DETAILED DESCRIPTION OF VARIOUS EMBODIMENTS

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Apparatuses, Methods, Systems, and Computer Program Products

As should be appreciated, various embodiments may be implemented in various ways, including as apparatuses, methods, systems, or computer program products. Accordingly, the embodiments may take the form of an entirely hardware embodiment, or an embodiment in which a processor is programmed to perform certain steps. Furthermore, various implementations may take the form of a computer program product on a computer-readable storage medium having computer-readable program instructions embodied in the storage medium. In such embodiments, any suitable computer-readable storage medium may be utilized including hard disks, CD-ROMs, optical storage devices, or magnetic storage devices.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary System Architecture

Figure 1:
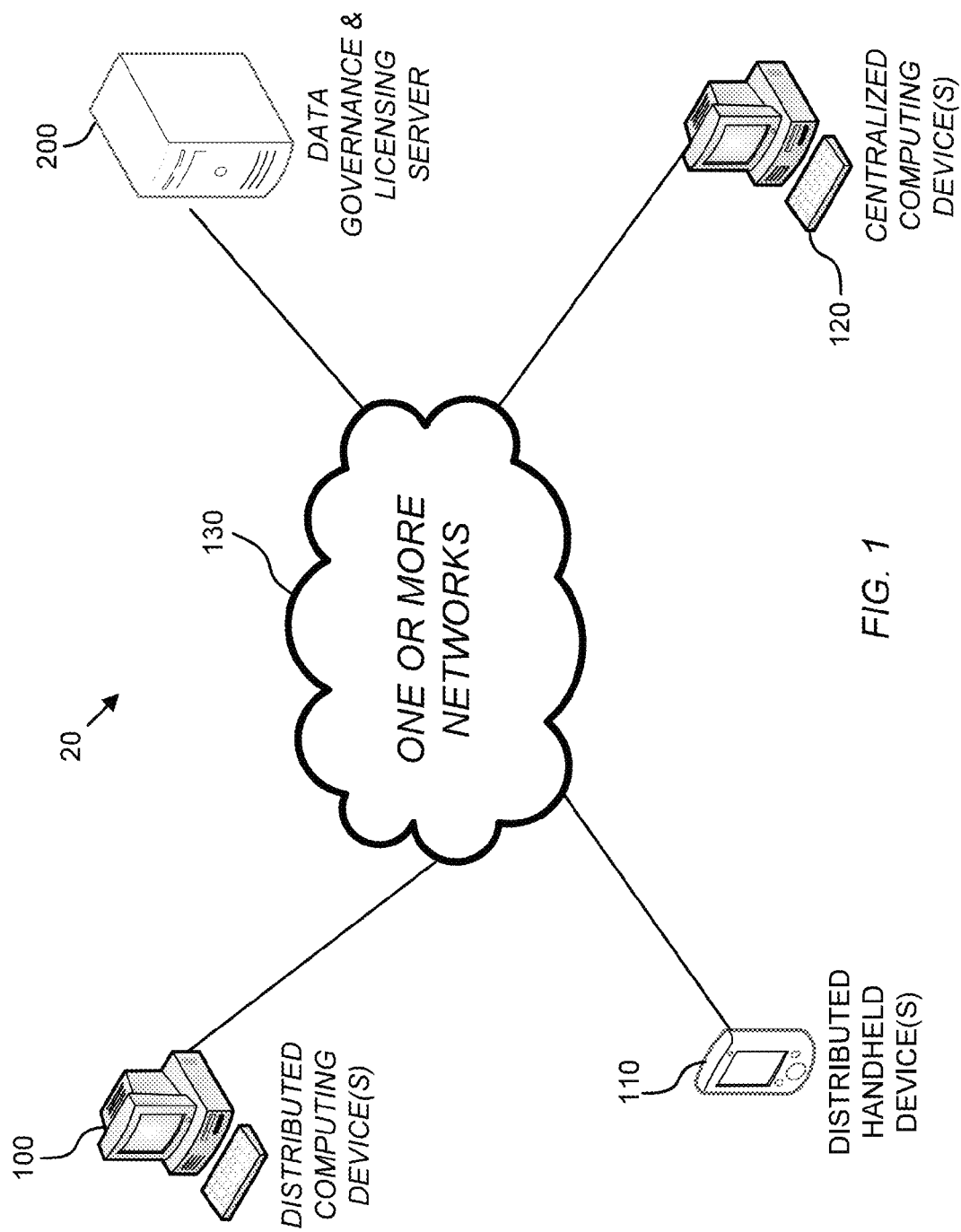
FIG. 1 is a block diagram of a data governance and licensing (DG&L) system 20 according to various embodiments.

FIG. 1 is a block diagram of a data governance and licensing (DG&L) system 20 that can be used in conjunction with various embodiments of the present invention. In at least the illustrated embodiment, the system 20 may include one or more distributed computing devices 100, one or more distributed handheld devices 110, and one or more central computing devices 120, each configured in communication with a data governance and licensing (DG&L) server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the server 200 are illustrated in FIG. 1 as communicating with one another over the same network 130, these devices may likewise communicate over multiple, separate networks. For example, while the central computing devices 120 may communicate with the server 200 over a wireless personal area network (WPAN) using, for example, Bluetooth techniques, one or more of the distributed devices 100, 110 may communicate with the server 200 over a wireless wide area network (WWAN), for example, in accordance with EDGE, or some other 2.5G wireless communication protocol.

According to one embodiment, in addition to receiving data from the server 200, the distributed computing devices 100, the distributed handheld devices 110, and the central computing devices 120 may be further configured to collect and transmit data on their own. Indeed, the distributed computing devices 100, the distributed handheld devices 110, and the central computing devices 120 may be any device associated with a carrier (e.g., a common carrier, such as UPS, FedEx, USPS, etc.). In certain embodiments, one or more of the distributed computing devices 100 and the distributed handheld devices 110 may be associated with an independent third party user, as opposed to a carrier. Regardless, in various embodiments, the distributed computing devices 100, the distributed handheld devices 110, and the central computing devices 120 may be capable of receiving data via one or more input units or devices, such as a keypad, touchpad, barcode scanner, radio frequency identification (RFID) reader, interface card (e.g., modem, etc.) or receiver. The distributed computing devices 100, the distributed handheld devices 110, and the central computing devices 120 may further be capable of storing data to one or more volatile or non-volatile memory modules, and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by UPS.

Data Governance and Licensing (DG&L) Server 200

In various embodiments, the data governance and licensing (DG&L) server 200 includes various systems for performing one or more functions in accordance with various embodiments of the present invention, including those more particularly shown and described herein. It should be understood, however, that the server 200 might include a variety of alternative devices for performing one or more like functions, without departing from the spirit and scope of the present invention. For example, at least a portion of the server 200, in certain embodiments, may be located on the distributed computing device(s) 100, the distributed handheld device(s) 110, and the central computing device(s) 120, as may be desirable for particular applications.

FIG. 2 is a schematic diagram of the DG&L server 200 according to various embodiments. The server 200 includes a processor 230 that communicates with other elements within the server via a system interface or bus 235. Also included in the server 200 is a display/input device 250 for receiving and displaying data. This display/input device 250 may be, for example, a keyboard or pointing device that is used in combination with a monitor. The server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the server 200.

In addition, the DG&L server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the DG&L server 200 may further provide the functions of a data storage device, which may store historical and/or current delivery data and delivery conditions that may be accessed by the server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, a data module 400, a monitoring module 500, a notification module 600, and a licensing module 700. In these and other embodiments, the various modules 400, 500, 600, 700 control certain aspects of the operation of the DG&L server 200 with the assistance of the processor 230 and operating system 280. In still other embodiments, it should be understood that one or more additional modules may also be provided, without departing from the scope and nature of the present invention.

In general, as will be described in further detail below, the data module 400 is configured to (i) receive, store, manage, and provide a variety of observed data 410 (see FIG. 5) associated with one or more users of tracking data associated with transport of one or more of a plurality of packages; and (ii) receive, store, manage, and provide to at least the monitoring module 500 a variety of existing data associated with one or more authorized users of tracking data associated with the transport of the plurality of packages. The monitoring module 500 is configured to activate an identification tool, which is configured to identify the accessing user based at least in part upon IP address data associated with the user's access request. Based upon the identity of the accessing user, the monitoring module 500 is further configured to activate an authorization tool, which is configured to analyze various observed data against various existing data, resulting in a labeling of the observed data as either variant or valid data. In certain embodiments, it is one or more predetermined threshold or "trigger" values that are compared against corresponding actual observed parameters within the usage data, so as to label the observed data as either variant or valid. The appropriately labeled variant and/or valid data is then transmitted by the monitoring module to at least the notification module 600. The notification module 600 is then configured to activate a notification tool, which analyzes the variant and/or valid data to ascertain whether one or more of a plurality of notifications should be generated and/or facilitated, or alternatively whether monitoring of data usage should simply continue. In certain embodiments, the notification tool is configured such that the notification module 600 will generate one or more licensing requests based upon at least any labeled variant data. Once generated, the notification module 600 is configured according to various embodiments to transmit the one or more licensing requests to the licensing module 700, which in turn executes a license tool configured to generate new license proposals for newly identified data users and/or updated license proposals for existing data users conducting activity beyond the scope of their preexisting license agreement(s).

In various embodiments, the program modules 400, 500, 600, 700 are executed by the DG&L server 200 and are configured to generate one or more graphical user interfaces, reports, and/or billing invoices (not shown), all accessible and/or transmittable to various users of the system 20. In certain embodiments, the user interfaces, reports, and/or billing invoices may be accessible via one or more networks 130, which may include the Internet or other feasible communications network, as previously discussed. In other embodiments, one or more of the modules 400, 500, 600, 700 may be alternatively and/or additionally (e.g., in duplicate) stored locally on one or more of the distributed computing devices 100, the distributed handheld devices 110, and/or the central computing devices 120, and may be executed by one or more processors of the same. According to various embodiments, the modules 400, 500, 600, 700 may send data to, receive data from, and utilize data contained in, a database, which may be comprised of one or more separate, linked and/or networked databases.

Also located within the DG&L server 200 is a network interface 260 for interfacing and communicating with other elements of the one or more networks 130. It will be appreciated by one of ordinary skill in the art that one or more of the server 200 components may be located geographically remotely from other server components. Furthermore, one or more of the server 200 components may be combined, and/or additional components performing functions described herein may also be included in the server.

While the foregoing describes a single processor 230, as one of ordinary skill in the art will recognize, the DG&L server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to the DG&L "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the SEAS server 200 may likewise be used without departing from the spirit and scope of embodiments of the present invention.

According to various embodiments, many individual steps of a process may or may not be carried out utilizing the computer systems and/or servers described herein, and the degree of computer implementation may vary.

DG&L Server 200 Logic Flow

Figure 3:
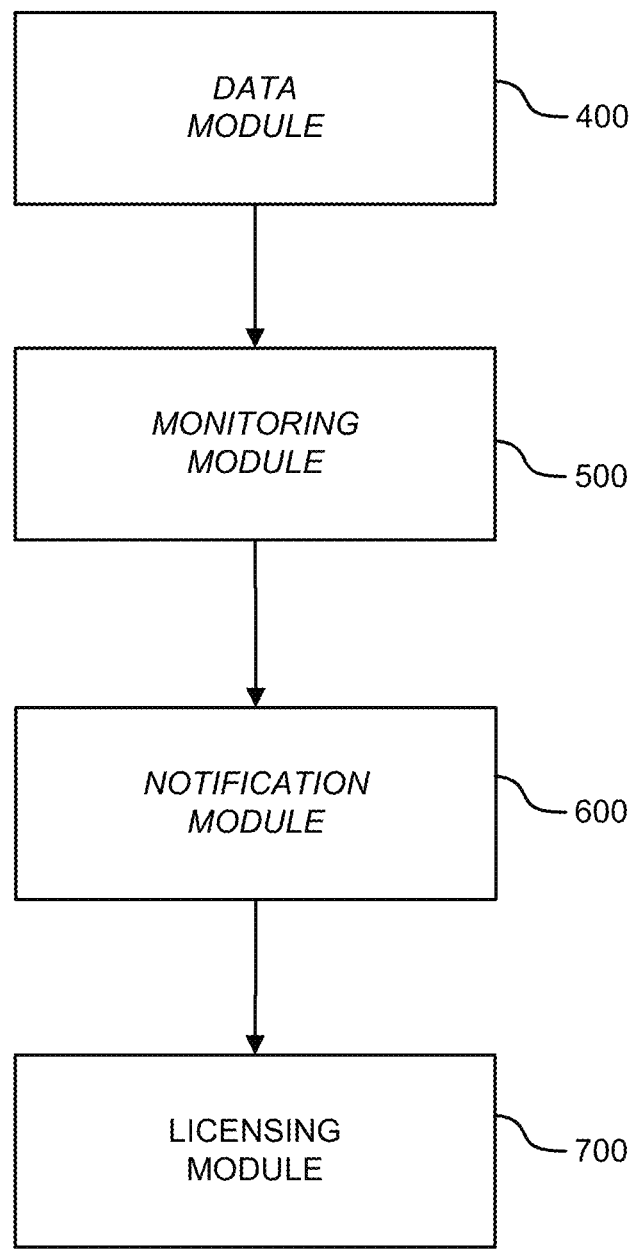
FIG. 3 illustrates an overall process flow for data governance and licensing management via various modules of the DG&L server 200 according to various embodiments.

Reference is now made to FIGS. 3 and 5-11, which illustrate various logical process flows executed by various embodiments of the modules described above. In particular, FIG. 3 illustrates the overall relationship of the modules 400, 500, 600, 700 of the data governance and licensing (DG&L) server 200, according to various embodiments. As illustrated, operation of the DG&L 20 begins, according to various embodiments, with the execution of the data module 400, which maintains and transmits various pieces of existing data that have been stored based upon predetermined registered and authorized user parameters and the like, along with received actual observed data to the monitoring module 500, as may be desirable according to various applications. Steps performed by various embodiments of the data module 400 are described in relation to FIG. 6; steps performed by various embodiments of the monitoring module 500 are described in relation to FIG. 7; steps performed by various embodiments of the notification module 600 are described in relation to FIGS. 8-9 and 11; and steps performed by various embodiments of the licensing module 800 are described in relation to FIG. 10.

Figure 4:
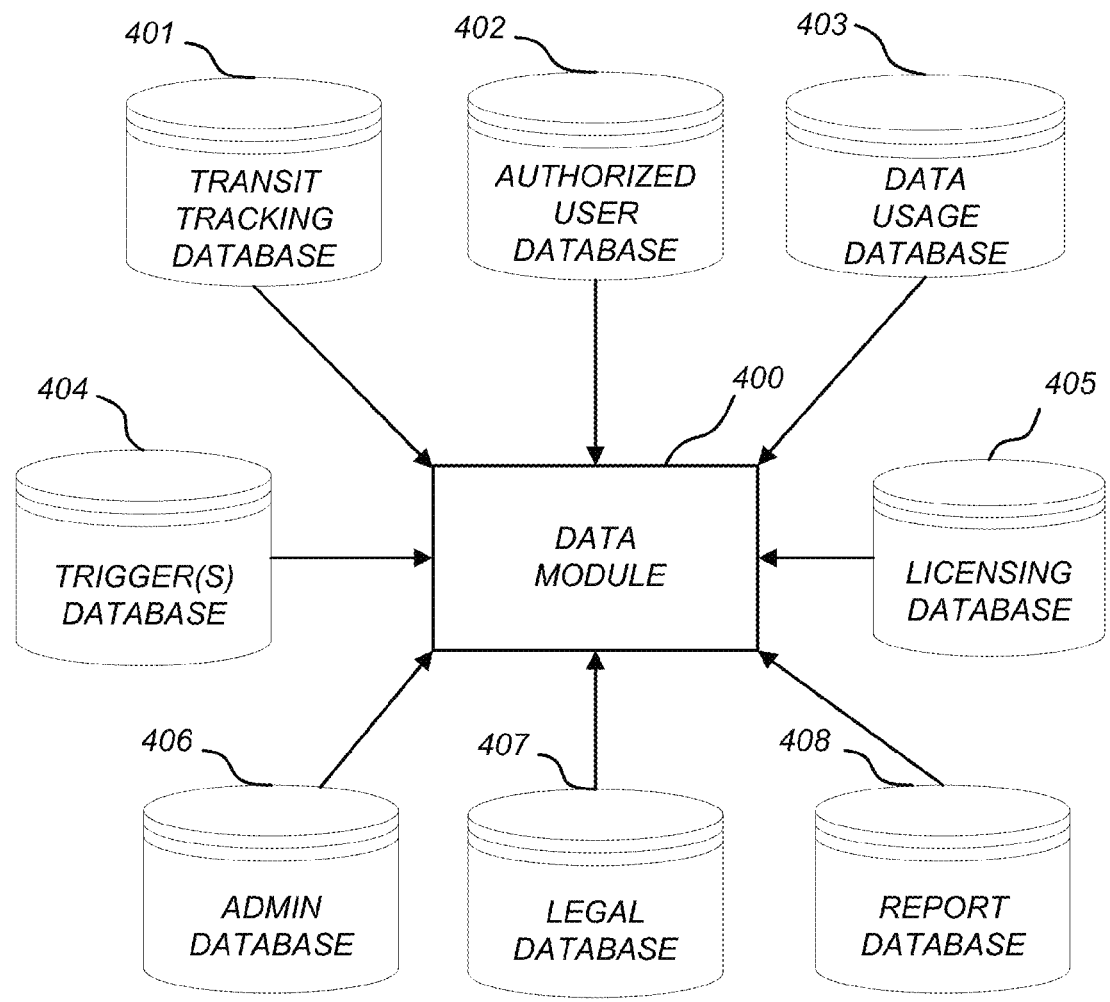
FIG. 4 illustrates a schematic diagram of various databases that are utilized by the DG&L system 20 shown in FIG. 1 according to various embodiments.

As described in more detail below in relation to FIGS. 4 and 5, the data module 400, according to various embodiments, retrieves newly observed (e.g., monitored, tracked, queried, etc.) data 410 and existing (e.g., previously observed, pre-determined parameters, pre-established usage terms, etc.) data 415 from one or more databases in communication with the module 400. FIG. 4 illustrates a block diagram of various exemplary databases from which the data module 400 receives, retrieves, and/or stores this information. In particular, in at least the embodiment shown in FIG. 4, the following databases are provided: a transit tracking database 401, an authorized user database 402, a data usage database 403, a trigger(s) database 404, a licensing database 405, an admin database 406, a legal database 407, and a report database 408. Although the embodiment of FIG. 4 shows these databases 401, 402, 403, 404, 405, 406, 407, 408 as being separate databases each associated with different types of data, in various other embodiments, some or all of the data may be stored in the same database. In still other embodiments, additional and/or alternative databases may be provided, as may also be desirable for particular applications.

According to various embodiments, the transit tracking database 401 may be configured to store and maintain at least the tracking data 411 associated with the shipping movement of one or more of a plurality of packages and/or containers. Such tracking data 411 may comprise a variety of data regarding one or more expected parameters associated with the transit (e.g., intake, transport, and delivery) of a plurality of packages. Such tracking data 411 may further, in certain embodiments, comprise the non-limiting examples of exception, scan error, missed scan and/or route deviation data, as generally produced by shipper or carrier transit systems, as commonly known and understood in the art, so as to not only accurately and efficiently manage movements of the plurality of packages, but also notify customers and/or recipients of pertinent data related thereto. Such tracking data 411 in these and still other embodiments, may further comprise data related to any of a variety of quite extensive parameters, such as the still further non-limiting examples of estimated/actual departure times, estimated/actual intermediate arrival/departure times, estimated/actual transit durations, estimated/actual delivery times, estimated/actual load assignments, estimated/actual flow routes, estimated/actual scan locations, times, and frequencies, estimated/actual handling parameters for small packages (e.g., those consolidated within larger packages and/or containers for consolidated handling), estimated/actual operational parameters such as facility volume, load volume, delays, invalid shipping data, re-routes, missing packages or labels upon packages, discrepancies, lookup failures, and the like, estimated/actual scan dates, time, locations, etcetera. In those and still other embodiments, it should be understood that, upon receipt, the transit tracking database 401 will store such data for later provision to one or more of the modules 400-700, all as will be described in further detail below. Of course, in any of these and still other embodiments, a variety of alternative configurations could exist, as commonly known and understood in the art.

According to various embodiments, the authorized user database 402 may be configured to store and maintain at least authorized user/usage data 416, contractual data 418, and/or IP address data 412. The authorized user/usage data 416 may comprise data configured to create a gating process to classify users via one or more of IP address, shipper tracked, and/or pattern analysis. The data 416 may comprise a variety of personal user information, user agreed-upon parameters for usage of tracking data, pre-approved user associated IP addresses (e.g., whether recorded or involving assigned prefixes unique to certain companies or entities), and the like. The authorized user/usage data 416 may further comprise any of a variety of data that would typically be collected for and from users seeking to register for permission and the right to use an access-controlled and/or gated system. In certain embodiments, authorized users, upon registering with the system (or otherwise) may enter into a contractual agreement, whereby usage of the tracking data 411 is governed by particular terms, parameters, and the like, subject further to periodic billing, as will be described later herein. In various embodiments, the authorized users may comprise any combination of the non-limiting examples of customers/consignees, third party freight handlers and/or auditors, freight contract consultants, internal clients and/or personnel, and the like. Still other embodiments may comprise one or more of anonymous users and/or data miners as "authorized users" based upon pre-determined authorization criteria, as may be established by the system provider, or otherwise. In various embodiments, the IP address data 412, which is likewise stored within the authorized user database 404 may be representative of particular authorized (or unauthorized users) and may be used to readily identify the user by, for example, use of a specifically assigned prefix for a particular user, or via one of a variety of mechanisms or configurations, as may be commonly known and understood in the art. In certain embodiments, the IP address data 412 may further comprise IP addresses associated with known unauthorized users, as may be desirable for particular applications. In any event, in these and still other embodiments, it should be understood that, upon receipt, the authorized user database 402 will store such data for later provision to one or more of the modules 400-700, all as will be described in further detail below. Of course, in any of these and still other embodiments, a variety of alternative configurations could exist, as commonly known and understood in the art.

According to various embodiments, the data usage database 403 may be configured to store and maintain observed usage data 413 related to the actual use of any portion of the tracking data 411 stored within the data module 400 and/or still further tracking data, as may be desirable. The observed usage data 413 may comprise details regarding usage such as the non-limiting examples of type or nature of data used, volume of data used, frequency of data used, type of access involved with use, and the like. As a particular non-limiting example, the observed usage data 413 may indicate that the entity ABC Marketing (e.g., as identified at least in part by IP Address data 412) obtained (e.g., scraped) delivery destination and order placement time portions of tracking data 411 associated with packages containing the latest model phone provided by Orange Company for the purpose of identifying earlier adopter patterns for newly released products. In another particular non-limiting example, the observed usage data 413 may indicate that a third party carrier provider scraped shipping rate values for customers in their geographical area of service so as to enable them to more effectively and efficiently under-bid the shipping carrier provider whose data has been accessed. Whatever is recorded and/or observed, it should be understood that, upon receipt, the data usage database 403 will store such data for later provision to one or more of the modules 400-700, all as will be described in further detail below. Of course, in any of these and still other embodiments, a variety of alternative configurations could exist, as commonly known and understood in the art.

According to various embodiments, the trigger(s) database 404 may be configured to store and maintain trigger data 417 related to one or more parameters or thresholds beyond which use of the tracking data 411 exceeds or deviates from that which was agreed upon, for example as evidenced in the contractual data 418 associated with an authorized user. As a non-limiting example, the trigger data 417 may comprise a particular volume of data use, beyond which a notification or alert may be generated, as will be described in further detail below. Other non-limiting examples of the trigger data 417 comprise frequency thresholds of use, limits upon use of specific types of data, limit on particular manner of accessing data, and the like. In certain embodiments, at least some portion of the trigger data 417 may be generic in nature, such that it is not associated with a particular authorized user, but instead provides typical thresholds and/or parameters apart from which one or more notifications, alerts, or actions may be generated, even for unauthorized users, all as will be described in further detail below. In any of these and still other embodiments, it should be understood that, upon receipt, the trigger(s) database 404 will store such data for later provision to one or more of the modules 400-700, all as will be described in further detail below. Of course, in any of these and still other embodiments, a variety of alternative configurations could exist, as commonly known and understood in the art.

According to various embodiments, the licensing database 405 may be configured to store and maintain licensing data 419 associated with one or more users of the data governance and licensing (DG&L) system. In certain embodiments, the licensing data 419 may comprise previously entered into and/or negotiated licenses with presently authorized users of the system. In other embodiments, the licensing data 419 may comprise proposed licensing arrangements either for future use (e.g., pre-populated templates) or being used in ongoing negotiations with an unauthorized user, so as to establish future agreements and/or terms, which could then, as a non-limiting example, be stored in associated portions of at least trigger data 417, contractual data 418, and/or authorized user/usage data 416, as described elsewhere herein. It should be understood, however, that upon receipt the licensing database 405 will store such data for later provision to one or more of the modules 400-700, all as will be described in further detail below. Of course, in any of these and still other embodiments, a variety of alternative configurations could exist, as commonly known and understood in the art.

According to various embodiments, the admin database 406 may be configured to store and maintain a variety of data related to the administration and security of the data governance and licensing (DG&L) system. As non-limiting examples, the admin database 406 may be configured to receive, manage, and store a plurality of data related to user identification, including user login and password information, user verification and/or authentication codes, and the like. The admin database 406 may further comprise a variety of usage format rights (e.g., field access control versus defaulting to a standard record layout), location dependent scope rights (e.g., based upon international and/or national privacy laws), billing rates and matrices, invoice format preferences, trigger parameters and/or thresholds (particularly if not likewise stored in the triggers database 404), account payment authentication data, remittance processing and recordkeeping (e.g., aging, calls, resolutions, etc.) data, collections records (e.g. aged accounts, suspended accounts, etc.), and the like. In certain embodiments, the admin database 406 may be configured to maintain and store IP address data 412 associated with each of a plurality of authorized users of the DG&L system. In other embodiments, the admin database 406 may be configured to further maintain and store IP address data 412 associated with various unauthorized users that have been identified as being prone to use of at least various portions of the tracking data 411. In any of these and still other embodiments, however, it should be understood that, upon receipt, the admin database 406 will store such data for later provision to one or more of the modules 400-700, all as will be described in further detail below. Of course, in any of these and still other embodiments, a variety of alternative configurations could exist, as commonly known and understood in the art.

According to various embodiments, the legal database 407 may be configured to store and maintain data related to various legal considerations that may surround the use and access of at least the tracking data 411, the IP address data 412, the observed usage data 413, and/or any additional pieces of information and data stored within the data module 400 according to various embodiments. In certain embodiments, the legal database 407 may be configured to comprise at least data associated with shipper consent administration, automated legal notification parameters, guidelines for access and privacy bases upon a plurality of governing regulations, data associated with end-user license agreements (e.g., such as those further contained in the licensing database 405 or otherwise), and/or correspondence having legal implications, as may be determined according to various applications. It should be understood, however, that in any of these and still other embodiments, upon receipt, the legal database 407 will store such data for later provision to one or more of the modules 400-700, all as will be described in further detail below. Of course, in any of these and still other embodiments, a variety of alternative configurations could exist, as commonly known and understood in the art.

According to various embodiments, the report database 408 may be configured to store and maintain data related to any a variety of the data described previously herein and in at least FIG. 4. In this manner, it should be understood that the report database 408 may comprise data received from any one of the distributed handheld device(s) 110, the distributed computing device(s) 100, and the centralized computing device(s) 120, as may be convenient for particular applications. This data may be formatted, embedded within, and transmitted as part of one or more of a variety of reports, as may be desirable for particular applications. The reports may be any of a variety of formats themselves (e.g., textual, graphical, a combination thereof, etc.), all as are commonly known and understood in the art. The report database 408 may, in certain embodiments, be further configured to generate, store, and maintain data and records associated with any of a variety of notifications that may be generated and/or transmitted by the system. In any of these and still other embodiments, it should be understood that, upon receipt, the report database 408 will store such data for later provision to one or more of the modules 400-700, all as will be described in further detail below. Of course, in any of these and still other embodiments, a variety of alternative configurations could exist, as commonly known and understood in the art.

According to various embodiments, any of the previously described databases may be configured to store and maintain not only textually based data, but also graphically based data, as may be generated by the data governance and licensing (DG&L) system 20 (or otherwise) and based, at least in part, upon the textually based data. Still further graphical (e.g., charts, graphs, maps, etc.) may also be stored within one or more of the databases, wherein such may be, at least in part, independently derived, relative to the textually based data. Non-limiting examples of such graphically based data include trend graphs, historical plot charts, pie charts, diagrams, and the like, all as will be described in further detail elsewhere herein. In any event, it should be understood that in any of these and still other embodiments, the graphically based data may be used to visually combine various portions of data contained within the various databases previously described herein.

Summary of Exemplary System Operation

As indicated above, various embodiments of the DG&L server 200 execute various modules (e.g., modules 400, 500, 600, 700) to monitor, manage, and report usage of a variety of tracking data and tracking assets by a plurality of authorized and unauthorized parties. The modules of the DG&L server are configured to determine the identity of a using party, determine whether the party is authorized to access the data in the manner done or whether the access triggers one or more notification alerts and/or reports in response thereto. The data relied upon by the DG&L server is retrieved not only from the above-described various databases, but also provided by the one or more users of the system associated therewith.

According to the embodiment shown in FIG. 5, the data governance and licensing (DG&L) server 200 begins with the execution of the data module 400, which retrieves, stores, and manages a myriad of actual (e.g., observed or monitored) data 410 and existing (e.g., previously acquired) data 415. When data is received, particularly in the form of the actual (e.g., observed or monitored) data 410, which is collected both during the physical transport of each of the plurality of packages and upon access and/or usage of at least portions of the tracking data 411 by one or more of a plurality of parties, the data module 400 is generally configured to provide the same, along with at least a portion of the existing data 415 to the monitoring module 500. In certain embodiments, the data module is further configured to provide at least some portion of data, for example licensing data 419 to the licensing module 700, namely for purposes of the latter generating new licensing proposals and/or updating or revising pre-existing licensing arrangement terms and conditions, the latter of which may incorporate at least the certain additional portions other components of data stored within the data module 400, as may be desirable for particular applications.

As a non-limiting example, which will be referred to later throughout herein, the data module 400 may observe tracking data usage by an existing and authorized provider of small package services to customers from multiple carriers (as determined at least in part from the IP address data 412) and may access at least some portion of authorized user/usage data 416, trigger(s) data 417, and licensing data 419 (see all in FIG. 5) to determine whether the observed usage is authorized or not. This non-limiting example will be referred to further below-herein.

As another non-limiting example, a previously unauthorized third party rate negotiation service provider may be observed (e.g., by the data module 400) accessing data of certain customers and scraping therefrom shipping rates, arguably for the intended purpose of presenting underbid shipping offers to those customers, at which time the data module 400 may forward the observed data to the monitoring module 500 and subsequently at least one of the notification and licensing modules 600-700 so as to best determine whether or not a licensing agreement offer, or one or more alternative actions (e.g., legal or otherwise) should be commenced against the third party rate negotiation service provider. This non-limiting example will be referred to further below-herein.

As a still further non-limiting example, an internal service monitoring application may be configured to periodically query tracking data for the purpose of identifying failure exceptions and/or other discrepancies, so as to identify areas for improvement. The data module 400, in such example, will likewise determine whether actual data (e.g., observed usage data) has been received, and if so forward such to at least the monitoring module 500 for further processing.

In various embodiments, the monitoring module 500 is configured to activate and execute a user identification tool 510 that determines the identity of the user or party that is accessing at least the tracking data 411 in the manner reflected in at least the observed usage data 413. As will be described in further detail below, it should be understood that in certain embodiments, the identification data 513, once generated, may be based at least in part upon parameters within the IP address data 412, such as the non-limiting examples of a pre-assigned address prefix that is associated affirmatively with a particular user or party. In other embodiments, it should be understood that that identification data 513 may be based on any of a variety of additional and/or alternative data. In these and still other embodiments, once the party accessing and/or using the data is identified, the monitoring module 500 is configured to further activate and execute an authorization tool 515 that determines whether any discrepancies exist between at least the actual data 410 (e.g., the observed usage data 413, the tracking data 411, and the IP address data 412) and the identification data 513, as compared with at least some portion of the existing data 415. In at least one embodiment, as will be described in further detail below, the authorization tool 515 determines first whether the identified party is a pre-authorized user of the data and if so, whether the specific present usage departs in any degree form previously approved usage terms. In another non-limiting example, the authorization tool 515 can also assess previously unauthorized users.

In any of the above described and still other embodiments, if the authorization tool 515 identifies one or more discrepancies, which may be associated with one or more trigger parameters and/or thresholds, as will be described in greater detail below, the tool is configured to label at least some portion of the actual data 410 as variant data 518. If no discrepancies are identified, or at least no discrepancies triggering any alert parameters and/or thresholds, as will also be described in greater detail below, the authorization tool 515 is configured according to various embodiments to identify at least some portion of the actual data 410 as valid data 519. Valid and variant data alike are then transmitted according to various embodiments, by the monitoring module 500, to the notification module 600. Of course, various alternatives exist, all of which will be described in further detail below.

In various embodiments, the notification module 600 is configured to receive and/or retrieve variant data 518 from the monitoring module 500. As will be described in further detail below, the variant data 518 may comprise portions of actual data 410, identification data 513, and/or existing data 415. Upon receipt and/or retrieval thereof, in certain embodiments, the notification module 600 is configured to activate and execute a notification tool 610 that determines whether one or more notifications are desired, based at least in part upon the variant data 518. Non-limiting examples of notifications range from simply generating a continued monitoring request (e.g., to see whether variances continue to occur or if the observed variance was an isolated incident) to generating a licensing request and/or generating one or more of a variety of alerts and/or reports (e.g. an alarm of the variance and/or a report cataloging the same and/or a report establishing licensing and billing procedures in conjunction with licensing negotiations and agreement, or the like, all as will be described in further detail below). Generated requests, alerts, and/or reports are, in turn, according to various embodiments, further transmitted to one or more of the monitoring, data, and/or licensing modules 400, 500, and 700.

In various embodiments, the notification module 600 is further configured to receive and/or retrieve not only the variant data 518 but also at least portions of valid data 519, as may be desirable for particular applications. Upon receipt and/or retrieval thereof, the notification module 600 may be configured to activate and execute the notification tool 610 so as to determine whether one or more notification are desired based at least in part upon the valid data 518. For example, even where the observed usage data 413 is determined valid, as analyzed by the monitoring module 500, certain notifications may nevertheless remain desirable, including the non-limiting examples of continuing monitoring thereof, commencing billing procedures therefor, requesting two-way verification of user identity, and generating one or more alerts and/or reports of, for example, data usage over time and/or relative to a pre-determined threshold. Generated requests, alerts, and/or reports are, in turn, according to various embodiments, further transmitted to one or more of the monitoring, data, and/or licensing modules 400, 500, and 700. Of course, various alternatives may exist, all as will be described in further detail below.

According to various embodiments, the licensing module 700 is configured to receive and/or retrieve at least some portion of variant data 518 from the monitoring module 500 and/or the notification module 600. In certain embodiments, at least some portion of the existing data 415 (e.g., that associated with the identified party using the data or otherwise) is also received and/or retrieved by the licensing module. Upon receipt and/or retrieval thereof, the licensing module 700 is configured to determine whether the variance should result in either a new license proposal or a revision/update to an existing license agreement. In certain embodiments, this determination is made at least in part upon the existing data 415 provided by, for example, the data module 400. In other embodiments, various alternatives may exist, as may be desirable for particular applications, and as will be described in further detail below.

In any of these and still other embodiments, however, it should be understood that once a license proposal is generated, whether newly or from a pre-existing agreement, the licensing module 700 is configured to further transmit the same to at least the data module 400 and the notification module 600. In certain embodiments, thus, the notification module 600 may be further configured to execute the notification tool 610 to determine whether at least one or more administrative tasks should be commenced based upon the received and/or retrieved licensing proposal. Various alternatives in this regard will also be described in further detail below.

Data Module 400

According to various embodiments, the data module 400 is configured to receive, store, and maintain actual (e.g., observed and/or monitored) data 410 and existing (e.g., previously acquired) data 415, all associated with physical transport of each of a plurality of packages, and access or usage of at least portions of tracking data associated further therewith by one or more of a plurality of parties.

As generally understood, actual data 410 comprises tracking data 411, which itself comprises any of a variety of data observed during transit, whether scanned from a particular package or otherwise. Such data and the components thereof are generally known and understood in the art and as such, will not be described in any particular detail herein, other than to mention particular non-limiting examples such as estimated/actual departure times, estimated/actual intermediate arrival/departure times, estimated/actual transit durations, estimated/actual delivery times, estimated/actual load assignments, estimated/actual flow routes, estimated/actual scan locations, times, and frequencies, estimated/actual handling parameters for small packages (e.g., those consolidated within larger packages and/or containers for consolidated handling), estimated/actual operational parameters such as facility volume, load volume, delays, invalid shipping data, re-routes, missing packages or labels upon packages, discrepancies, lookup failures, and the like, estimated/actual scan dates, time, locations, etcetera. Of course, still other various types and/or combinations of tracking data 411 may be envisioned, as may be desirable for particular applications, without departing for the nature of the present invention, which is tailored to, at least in part, monitor the access and/or usage of such data, in whatever form present.

The actual data 410 according to various embodiments further comprises IP address data 412, which may be obtained, as a non-limiting example, by monitoring and recording the IP address associated with any of a plurality of parties monitored and identified as accessing and/or using at least some portion of the tracking data 411. In certain embodiments, the IP address data 412 may be provided by a particular party upon registration with the DG&L system; however, in those and still other embodiments, it should be understood that the data accessing party's IP address may be independently monitored and/or verified, for purposes such as the non-limiting examples of identity authentication, licensing negotiating, and billing, all as will be described in further detail below.

In various embodiments, the IP address data 412 may be formatted such that at least a portion of the data is pre-configured so as to automatically identify the particular party associated therewith. As a non-limiting example, as is generally known and understood in the art, specific users (e.g., corporate entities) may be assigned IP address prefixes that are restricted solely to their use, thereby inherently identifying them as the accessing party, where such is known and/or readily available to the DG&L system. Of course, still other variations of accessing party identification may be envisioned, as will be described later herein, including alternative mechanisms for configuring IP address data 412 and the like.

The actual data 410 according to various embodiments further comprises observed usage data 413, which may be obtained, as a non-limiting example, by monitoring the use of at least the tracking data 411 by one or more parties. Such may be accomplished via any of a variety of methods; however, as a non-limiting example, a shipping provider may routinely catalog inquiries to its proprietary shipment tracking systems (e.g., by an accessing party entering a tracking number on an associated database) and thus be configured to record and/or document details of such inquiries, including portions and types of data accessed, viewed, copied, forwarded, and the like. Any of a variety of activities may be monitored, as should be generally understood from a variety of resources commonly known and used in the art and otherwise for tracking and record the activity of users performed within and/or on a particular system or server. For purposes of brevity, specific data monitoring techniques will not be extensively described herein, as such are likewise generally known and understood in the art.

The existing data 415 according to various embodiments may likewise comprise any of a variety of data, including the non-limiting examples, as illustrated in at least FIG. 5, of authorized user/usage data 416, trigger(s) data 417, contractual data 418, and/or licensing data 419, all as have been described previously herein and as will be referred to subsequently herein with reference to at least the monitoring module 500. That being said, it should be understood that the specific examples of such data are intended for purposes of illustration only and, as such, should not be construed as limiting upon the scope of the present invention.

FIG. 6 illustrates steps that may be executed by the data module 400 according to various embodiments. Beginning with step 425, the data module 400 is configured in certain embodiments to assess whether any actual data 410, as has been previously described herein, has been received by the module. In these and other embodiments, the data module 400 makes this assessment by periodically scanning one or more databases associated with the module (e.g., see FIG. 4) and by identifying some portion of data within one or more of the databases that was not present during a previous periodic scan under step 425. In other embodiments, the one or more databases of FIG. 4 or otherwise may be configured to notify the data module 400 of input of some portion of new data, as may be desirable for certain application. In still other embodiments, the monitoring module 500 may be configured to notify the data module of at least new observed usage data 413 and new IP address data 412, as may also be desirable for particular applications. That being said, in in any of these and still other embodiments, if new actual data 410 is identified, it should be understood that the data module 400 is configured to proceed to step 440, wherein at least a portion of the actual data is transmitted to the monitoring module 500.

Otherwise the data module 400 proceeds into what is essentially a static loop via step 430, whereby the module is configured to await receipt (or notification of) actual data 410. In certain embodiments the static loop via step 430 causes the data module 400 to enter into a substantially passive state (e.g., awaiting prompting), while in other embodiments, the module may be configured otherwise, such as to periodically prompt on or more of the remaining modules for updates, as may be desirable for particular applications.

Although not particularly illustrated in FIG. 6, which details the receipt of actual data 410, it should be understood that in various embodiments, the data module 400 is further configured further to receive various pieces of the existing data 415, whether prior to commencing monitoring or as updates or additions thereto are acquired. As a non-limiting example, which will be returned to later, the data module 400 may receive contractual data 418 and/or trigger(s) data 417 for a particular user that was not previously documented within one or more databases of the data module 400, and such receipt may be in response to execution of the license tool 710 of the licensing module 700, all as will be described in further detail below.

As previously mentioned, if the data module 400 determines that actual data 410 and/or existing data 415 has been received in, for example step 425 (see FIG. 6), the data module is configured to proceed to step 440. During step 440, the data module transmits actual data 410 and in certain embodiments at least a portion of the existing data 415 data to the monitoring module 500. In other embodiments, as will be described later herein with respect to at least FIG. 7, the data module 400 may only initially transmit at least a portion of the actual data 410 to the monitoring module 500, with the monitoring module subsequently retrieving at least some portion of the existing data 415 from the data module, as necessary for particular applications.

Monitoring Module 500

With reference now to FIG. 7, according to various embodiments, the monitoring module 500 is configured to receive and/or retrieve at least a portion of the actual data 410 and/or the existing data 415 from the data module 400, as illustrated in steps 520 and 545, respectively. As illustrated, it should be understood that in certain embodiments, the data may be received and/or retrieved in separate steps; however, in still other embodiments, data may be collectively received and/or retrieved by the monitoring module 500 in a single step, as may be desirable for particular applications. In any of these and still other embodiments, however, as has been previously described herein, it may be the monitoring module 500 actively queries and retrieves the data from the data module 400, while in other embodiments any combination of the data may be instead automatically transmitted to the monitoring module with no advance activity necessary on its part. Of course, any of a variety of data transfer mechanisms, parameters, and/or configurations may be incorporated between the respective modules 400 and 500, as may be desirable for particular applications.

Remaining with FIG. 7, it should be understood that according to various embodiments, upon receipt and/or retrieval of data in at least step 520, the monitoring module 500 is configured to execute (e.g., activate and run) an identification tool 510, as previously described herein. In certain embodiments, the identification tool 510 is configured to analyze at least a portion of the actual data 410 (for example, the IP address data 412) to determine the identity of the party who is accessing, viewing, and/or using at least some portion of the tracking data 411 stored within or accessible via the data module 400. It should be understood that the identification tool 510 may incorporate any of a variety of algorithms to achieve the data analysis for which it is configured, all as commonly known and understood in the art. In any of these and still other embodiments, however, once the identification tool 510 is activated, the monitoring module 500 is configured to proceed to step 540, wherein user identification data 513 (see FIG. 5) is generated.

For purposes of describing step 540, it is helpful to return to the previous non-limiting example, whereby the identification tool 510 is configured to determine, at least in part based upon IP address data 412 that a provider of small package services (e.g., ABC Provider) is the entity accessing at least some portion of the tracking data 411 for the purpose of scraping therefrom shipping details for purposes of providing the same, via updates or otherwise, to its customers. In step 540, thus, the identification tool 510 is configured to generate user identification data 513 (see FIG. 5) that may comprise any of a variety of data, such as the non-limiting examples of entity name, entity location, entity contact information, entity business model, and the like, as may be desirable for particular applications. In certain embodiments, the user identification data 513 may further comprise, for example embedded therein, at least the IP address data 412, so as such may be forwarded on to at least an authorization tool 515 of the monitoring module 500, where such may be necessary (for example where the IP address(es) themselves must be authenticated along with the identification data, as will be described in further detail below.

According to various embodiments, with continued reference to FIG. 7, once the user identification data is generated in step 540, the monitoring module 500 is configured to proceed to step 545, wherein the module may retrieve at least a portion of the existing data 415 from the data module 400. It should be understood in any of these and still other embodiments that, as has been previously described herein, such data may be retrieved prior to execution of the identification tool in step 530; however, in either scenario, the monitoring module is generally configured such that the existing data is available for execution of the authorization tool 515, as occurs in step 550.

During step 550, as illustrated in FIG. 7, the monitoring module 500 is configured to execute an authorization tool 515 (see also FIG. 5) to compare at least some portion of the actual data 410 against at least some portion of the existing data 415. In certain embodiments, the authorization tool 515 compares the usage data 413 against pre-established usage data 416, thus determining whether the newly received usage deviates in any fashion from one or more authorized parameters. In at least one embodiment, the data is further compared to one or more threshold values, as contained within at least trigger(s) data 417 to determine whether one or more corrective actions need to be taken based at least in part on the usage data 413, all as will be described in further detail below. As a non-limiting example, the authorization tool 515 may be configured to compare the volume of tracking data 411 accessed by a particular small package service provider over a two day period with previously determined volumetric and/or frequency-based parameters associated with contractual data 418 and/or licensing data 419 previously signed by the small package service provider. If one or more deviations are identified, the monitoring module 500 is configured according to various embodiments to identify at least some portion of the compared data as variant data 518 in step 570. If not deviations, or at least if no significant deviations are identified, the monitoring module 500 may be configured according to various embodiments to identify at least some portion of the compared data as valid data 519 in step 560. In either circumstance, the monitoring module 500 may be configured to subsequently contact the notification module during step 580, for further processing and handling of either the valid or the variant data, as may be the case.

Returning to another non-limiting example, it may be understood that during step 550 the monitoring module 500 may be configured to not only compare usage data 413 against existing authorized user/usage data 416 and/or contracts or licensed entered into thereby, but also to continuing monitor ongoing unlicensed activities. For example, the previously mentioned third party rate negotiation service provider may have not previously contracted to use any portion of the tracking data 411; however, the shipping provider utilizing the DG&L system may likewise, according to certain embodiments, establish any of a variety of threshold-related data (e.g., trigger(s) data 417) that will facilitate the identification of either variant 518 or valid data 519. For instance, if a threshold is established as use of data for less than 100 packages a day, observed usage data 413 of 80 packages a day would result in valid data 519, as calculated by the authorization tool 515, whereas data of 250 packages a day would result in variant data 518. It should be understood that under this scenario, the variation is between the observed data and parameters set by the DG&L system provider, as opposed to parameters set by additional parties (e.g., the shippers, or otherwise).

Still further, our third non-limiting example, also previously referenced herein, which involves internal service monitoring for audit (or other) purposes could be configured according to various embodiments, wherein internal usage is a parameter evaluated by the authorization tool 515 and such is automatically identified as valid data in step 560, provided the internal usage is performed by a valid audit-department based IP address, as may be stored within IP address data 412. Of course, any of a variety of internal versus external parameters may be also established, along with volume, frequency, and the like parameters, each of which may be used by the monitoring module 500 during the course of executing the authorization tool during step 550, as illustrated in FIG. 7.

In yet another non-limiting example, wherein an external party may access and use at least some portion of tracking data 411, the monitoring module, and in particular the authorization tool 515 thereof, may determine whether variant or valid data exists at least in part upon the basis of the type of access provided. Indeed, in at least one embodiment, only standard view information may be approved for access by a third party marketing entity, whereby typical data such as time, date, and location of delivery tracking data may be authorized. If, for example, that third party marketing entity accesses portions of the tracking data typically only available via an alternative view, such as for example a quantum view, whereby information such as scan errors, misroutes, and the like, may be available, such could thus be properly identified by the authorization tool and the monitoring module 500 as variant data 518, with such being marked for further processing by at least the notification module 600, as will be described in further detail below.

Notification Module 600

With reference to FIGS. 8 and 9, according to various embodiments, the notification module 600 is configured to receive notification of either of variant data 518 or valid data 519 from the monitoring module 500. As a result, generally two divergent processes occur via the notification module 600, each of which are discussed in turn, herein below.

With particular reference to FIG. 8, the notification module 600 according to various embodiments is configured in step 620 to receive notification that variant data 518 has been identified by the monitoring module 500. Once so notified, the notification module 600 in certain embodiments may be configured in step 625 to retrieve at least the variant data 518, whether from the monitoring module 500 or otherwise (e.g., the data module 400). In other embodiments, the variant data 518 may, alternatively, be automatically provided to the notification module 600 by any of the remaining various embodiments, as may be desirable for particular applications. In any of these and still other embodiments, however, once received/retrieved, the notification module 600 proceeds to step 630, wherein a notification tool 630 is executed by the module.

Via execution of the notification tool 630, the notification module 600 determines whether one or more notifications, actions, and/or corrective measures are necessary, based at least in part on the content of the variant data 518. If further action is required, the notification module 600 proceeds via one or more of a variety of options, as will be described, in turn, below. As a non-limiting example, the notification module 600 may examine the variant data 518 and assess that, as concluded by the monitoring module 500, that the unauthorized access by the third party rate negotiation service provider was inappropriate, but that it was the first time in six months that this particular provider has used any portion of tracking data 411 or the like. As a result, the notification module 600 may, in at least this scenario, proceed via step 640 to generate a request for continued monitoring of this particular provider, further notifying at least the monitoring module thereof in step 641. In certain embodiments, the data module 400 may be additionally and/or alternatively notified under such scenarios, whereby an annotation indicative of the heightened monitoring request may be stored, for example, in at least the trigger(s) data 417.

According to various embodiments, at step 635, the notification module 600 may proceed, based at least in part upon the content of the variant data 518 to step 642, wherein the module may be configured to generate one or more reports, the latter being likewise, at least in part, based upon the scope and content of the variant data 518. Remaining with the non-limiting example of the unauthorized access by the third party rate negotiation service provider, in addition to or as an alternative to proceeding via step 640 to request continued monitoring of the provider, the notification module 600 may proceed via step 642 to generate one or more reports detailing at least some portion of the usage event and the data recorded therein. In certain embodiments, a variety of parameters may be defined relative to ongoing monitoring and/or desired actions and notification(s) upon a subsequent new usage of at least some portion of tracking data 411 by the party in the future. Of course, any of a variety of configurations of reports may be envisioned, as are generally known and understood in the art.

The report(s) generated in step 642 may be communicated, via step 643 to at least the data module, although it should be understood that according to various embodiments, the reports generated may be made available to one or more parties of the DG&L system. In certain embodiments, the report(s) may be transmitted via known and commonly used avenues to any of a variety of parties, including the non-limiting examples of billing personnel, collections agencies, legal counsel, and the like, all as may be desirable for various applications. In certain embodiments, the reports may themselves be transmitted, while in other embodiments, simply a notification or alert of the existing of the stored report may be transmitted, permitting the recipient(s) thereof to initiate viewing, download, and/or any of a variety of actions with respect to the report(s), all as are generally commonly known and understood in the art.

According to various embodiments, at step 635, the notification module 600 may proceed, based at least in part upon the content of the variant data 518 to step 644, wherein the module may generate one or more licensing requests configured to initiate and/or facilitate the creation and entrance into a licensing agreement with the observed party. In certain embodiments, the notification module 600 may proceed via step 644 to notify one or more parties using the DG&L system (e.g., legal counsel, account managers, and the like) to instruct them to initiate and/or facilitate contact, licensing negotiations, and the like with the data using party. In other embodiments, the notification module 600 may be configured in step 644 to first notify the licensing module, via for example step 645, whereby the DG&L system is configured to further analyze one or more documents prior to notifying one or more parties using the DG&L system of the licensing request generated in step 644.

Turning now to FIG. 9, the notification module 600 according to various embodiments may be further configured in step 650 to receive notification that valid data 598 has been identified by the monitoring module 500. Once so notified, the notification module 600 in certain embodiments may be configured in step 655 to retrieve at least the valid data 519, whether from the monitoring module 500 or otherwise (e.g., the data module 400). In other embodiments, the valid data 519 may, alternatively, be automatically provided to the notification module 600 by any of the remaining various embodiments, as may be desirable for particular applications. In any of these and still other embodiments, however, once received/retrieved, the notification module 600 proceeds to step 660, wherein a notification tool 630 is executed by the module.

Via execution of the notification tool 630, the notification module 600 determines whether one or more notifications, actions, and/or corrective measures are necessary, based at least in part on the content of the valid data 519. If further action is required, the notification module 600 proceeds via one or more of a variety of options, as will be described, in turn, below. As a non-limiting example, the notification module 600 may examine the valid data 519 and assess that, as concluded by the monitoring module 500, the authorized access by the small package service provider was within a pre-determined volume threshold or cap. As a result, the notification module 600 may, in at least this scenario, proceed via step 670 to generate a request for continued monitoring of this particular provider, further notifying at least the monitoring module thereof in step 671. In certain embodiments, the data module 400 may be additionally and/or alternatively notified under such scenarios, whereby an annotation indicative of the heightened monitoring request may be stored, for example, in at least the trigger(s) data 417, the contract data 418, and/or the licensing data 419.

According to various embodiments, at step 665, the notification module 600 may proceed, based at least in part upon the content of the valid data 519 to step 672, wherein the module may be configured to generate one or more reports, the latter being likewise, at least in part, based upon the scope and content of the valid data 519. Remaining with the non-limiting example of the authorized access by the small package service provider, in addition to or as an alternative to proceeding via step 670 to request continued monitoring of the provider, the notification module 600 may proceed via step 672 to generate one or more reports detailing at least some portion of the usage event and the data recorded therein. As a non-limiting example, based upon at least some portion of the usage data 413, the notification module 600 may generate a billing matrix reflecting the usage and/or initiate generation of at least one invoice to processed and subsequently transmitted to the provider. In other embodiments, the notification module 600 may update a billing or usage matrix and make such available to the provider, via for example an online user interface, as such are generally known and available in the art for permitting user viewing of billing and/or account usage details. Of course, any of a variety of configurations of reports may be envisioned, as are generally known and understood in the art. Still further, in certain embodiments, the reports may themselves be transmitted, while in other embodiments, simply a notification or alert of the existing of the stored report may be transmitted, permitting the recipient(s) thereof to initiate viewing, download, and/or any of a variety of actions with respect to the report(s), all as are likewise generally commonly known and understood in the art.

According to various embodiments, at step 665, the notification module 600 may proceed, based at least in part upon the content of the valid data 519 to step 674, wherein the module may generate one or more licensing requests configured to initiate and/or facilitate a licensing request that may modify terms of a pre-existing contractual or licensing agreement with an authorized party. Such may, alternatively generate a request to initiate and/or facilitate a licensing agreement, wherein usage was below a shipping provider's cap for unauthorized usage (e.g., permitting some degree of unauthorized data mining), but for which the shipping provider may wish to consider entering an agreement with a repeat data user. Of course, in other embodiments, any such variations that would necessitate updating or creating a licensing request could be configured within at least the monitoring module 500 such that those scenarios always generate some portion of variant data 518, such that the process flow of FIG. 8 is initiated versus the flow of FIG. 9. Of course, in still other embodiments, the notification module 600 may be configured still alternatively, as some combination of the processes of FIGS. 8 and 9, or otherwise, as may be desirable for particular applications.

In any of those and still other embodiments, however, it should be understood that, with reference again to FIG. 9, that the notification module 600 may proceed via step 674 to notify one or more parties using the DG&L system (e.g., legal counsel, account managers, and the like) to instruct them to initiate and/or facilitate contact, licensing negotiations, and the like with the data using party. In other embodiments, the notification module 600 may be configured in step 674 to first notify the licensing module, via for example step 675, whereby the DG&L system is configured to further analyze one or more documents prior to notifying one or more parties using the DG&L system of the licensing request generated in step 674, all as will be described in further detail below. In any of these embodiments, it should be understood, of course, that the DG&L system is generally configured such that a gating process is established so as to monitor tracking data usage and where variations are identified, user authentication, whether via entrance into or updating of a licensing or contractual agreement is commenced. In this manner, usage of tracking data and tracking asset information is protected in a systematic and efficient manner, so as to not only realize an economic value therefrom, but also to prevent misappropriation thereof where authorization for use is either undesirable and/or not given.

Turning momentarily to FIG. 11, it should be further understood that according to various embodiments, the notification module 600 may be configured to receive one or more license proposals (e.g., licensing arrangement draft documents) from the licensing module 700, which will be described in further detail below. Upon receipt thereof in at least illustrated step 680, the notification module 600 may be configured to likewise execute the notification tool, largely as has been previously described herein, so as to generate one or more administrative task requests in step 690. Such request(s) may include the non-limiting examples of requesting initiation of discussions and negotiations with the data using party so as to facilitate signature of the license proposal and/or transmitting the license proposal to the data using party and inviting further contact and discussion. Of course, a variety of task request options exist, however it should be understood that each are generally configured via the notification module 600 such that previously unauthorized and/or variation usage of at least some portion of the tracking data is ultimately transformed or at least sought to be transformed into future authorized usage, so as to capitalize upon the use of tracking data and tracking asset information, as previously described herein.

With continued reference to FIG. 11, the notification module 600 may, in various embodiments, be further configured to notify the data module 695 of the generated administrative task request(s), at which time any of a variety of users of the system may be notified thereof. In certain embodiments, the request may be further stored and classified within the one or more databases (see FIG. 4) contained within the data module 400, as may be desirable for particular applications.

Licensing Module 700

According to various embodiments, with reference to FIG. 10, the licensing module 700 is configured in steps 720 and 730 to receive notification of at least variant data 518, as may be identified by the monitoring module 500 and/or further processed by the notification module 600, and/or as stored and classified by the data module 400, all as previously described herein. The licensing module 700 is in certain embodiments configured, upon receipt and/or retrieval of such data to proceed to step 735, wherein the licensing module 700 determines whether the variant data is associated with a previously licensed (e.g., authorized) user, as opposed to a previously unauthorized or unlicensed user. If the variance is observed upon an unlicensed user, the licensing module 700 proceeds to step 740 according to various embodiments; if the variance is upon an existing licensed user, the licensing module 700 proceeds to step 760, each as will be described in turn below in further detail.

If a variance is identified as upon an unlicensed user in step 735, the licensing module 700 is configured according to various embodiments to proceed in step 740 to generate a new license proposal. In certain embodiments, the proposal may be simply a request that is transmitted to one or more users of the system (e.g., legal counsel or the like), which may be configured as an alert that steps should be taken to actually generate the details and provisions within a particular license proposal. Such may be desirable where, for example, unique parameters of use or otherwise may be beneficial for those parties involved and/or in those scenarios where a final check/audit of the DG&L system may be desirable before automatically generating a license proposal containing terms and/or transmitting the same to the data using party. In other embodiments, the proposal may be a standard template licensing agreement that may be transmitted, with or without additional documentation, to the data using party. In at least one embodiment, such may include a request to contact the DG&L system provider and/or the tracking data generator to discuss terms of a potential license for continued use and/or access to at least the tracking data 411. According to these and still other embodiments, the licensing module 700 may be further configured to transmit at least some portion of the license proposal and/or data indicative thereof to one or more of the data module 400, the monitoring module 500, and/or the notification module 600, as has been described previously herein.

In a similar fashion, if a variance is identified as upon a previously licensed user in step 735, the licensing module 700 is configured according to various embodiments to proceed in step 760 to generate an update to an existing license, which may be referred to generically as an updated license proposal. The updated license proposal may involve additions or deletions to the existing licensing agreement or contract, along with revisions thereto, where parameters such as thresholds or caps may be in need of renegotiation, based at least in part upon the data usage observed by the monitoring module 500.

As described previously herein, in certain embodiments, the proposal may be simply a request that is transmitted to one or more users of the system (e.g., legal counsel or the like), which may be configured as an alert that steps should be taken to actually generate the details and/or revised provisions within a particular license proposal. Such may be desirable where, for example, unique parameters of use or otherwise may be beneficial for those parties involved and/or in those scenarios where a final check/audit of the DG&L system may be desirable before automatically generating a license proposal containing terms and/or transmitting the same to the data using party. In at least one embodiment, the updated license propose is generated by the licensing module 700 at least in part by first collecting licensing data 419 associated with the particular data using party in question from one or more databases within the data module, as described previously herein with reference to at least FIGS. 4 and 5. In any of these and still other embodiments, any transmitted correspondence to the data using party may further include a request to contact the DG&L system provider and/or the tracking data generator to discuss terms of an updated license for continued use and/or access to at least the tracking data 411. In still other embodiments, potential ramifications for failing to respond to the license proposal may further be transmitted, as may be desirable for particular applications.

Still further, according to these and still other embodiments, the licensing module 700 may be further configured to transmit at least some portion of the updated license proposal of step 760 and/or data indicative thereof to one or more of the data module 400, the monitoring module 500, and/or the notification module 600, all of which as have been described previously herein, such transmittal being represented at least by step 750 of FIG. 10.

Conclusion

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A data governance and licensing system for monitoring usage of tracking data associated with transport of a plurality of packages by a common carrier and for facilitating licensing arrangements in connection therewith and between the common carrier and a plurality of authorized parties, said system comprising:
    one or more memory storage areas containing tracking data related to one or more parameters associated with transport of a plurality of package, generic usage data, and authorized user data related to the plurality of authorized parties, the authorized parties comprising those parties authorized to access the tracking data, the generic usage data comprising at least one threshold associated with access to said tracking data, and the at least one threshold being based upon: (a) a volume of said access to said tracking data, (b) a duration of said access, and (c) a type of said access to said tracking data, wherein said type of said access to said tracking data, upon which the at least one threshold is based in part, comprises a determination of whether the authorized party is an external or internal party relative to said common carrier and an assessment of whether standard view information or tracking data has been accessed; and
    one or more computer processors configured to:
        (A) receive observed data associated with access of at least a portion of said tracking data by said at least one accessing party;
        (B) analyze at least a portion of the observed data to determine an identity of the accessing party, the determined identity being stored as identification data;
        (C) compare the identification data and the authorized user data to determine whether the accessing party is an authorized party;
        (D) in response to the accessing party not being an authorized party:
            i. determine whether one or more discrepancies exist between the observed data and the generic usage data; and
            ii. in response to one or more discrepancies existing, generate a license proposal request configured to govern future access to said tracking data by said at least one accessing party; and
        (E) in response to the accessing party being an authorized party:
            i. determine whether one or more discrepancies exist between the observed data and the authorized user data; and
            ii. in response to one or more discrepancies existing, generate a license revision request configured to govern future access to said tracking data by said at least one accessing party.

2. The data governance and licensing system of claim 1, wherein at least a portion of the observed data in (B) comprises an observed Internet Protocol address (IP address), said observed IP address being configured, at least in part, to identify a using party associated therewith.

3. The data governance and licensing system of claim 2, wherein:
    said authorized user data comprises one or more authorized IP addresses; and
    said one or more computer processors are further configured, in (C), to determine whether the accessing party is an authorized party based at least in part upon a comparison of said observed IP address with said one or more authorized IP addresses.

4. The data governance and licensing system of claim 1, wherein:
    said observed data comprises quantitative data related to the tracking data accessed; and
    said one or more discrepancies in (D) are determined based at least in part upon at least one parameter within said quantitative data exceeding said at least one threshold.

5. The data governance and licensing system of claim 4, wherein said at least one threshold is further based at least in part upon at least one of: a data-type of said access, a frequency of said access, or a classification of said access.

6. The data governance and licensing system of claim 4, wherein, in response to said quantitative data exceeding said at least one threshold, said one or more computer processors are configured to generate a license proposal request.

7. The data governance and licensing system of claim 1, wherein:
    said license proposal request comprises a draft licensing agreement; and said one or more computer processors are further configured to, in response to one or more discrepancies existing, transmit a notification of said draft licensing agreement to at least one party.

8. The data governance and licensing system of claim 7, wherein said notification is transmitted, in response to one or more discrepancies existing, to a party selected from a group consisting of: the at least one accessing party, an account administrator, and a legal representative.

9. The data governance and licensing system of claim 1, wherein said one or more computer processors are further configured to, in response to one or more discrepancies existing, generate one or more reports.

10. The data governance and licensing system of claim 1, wherein:
said observed data comprises quantitative data related to the tracking data accessed;
said authorized user data comprises at least one parameter associated with access to the tracking data; and
said one or more discrepancies in (E) are determined based at least in part upon at least one parameter within said quantitative data being substantially different from a corresponding one of said parameters associated with access to the tracking data.

11. The data governance and licensing system of claim 10, wherein:
said at least one parameter associated with access to the tracking data comprises at least one authorized threshold; and
said one or more discrepancies in (E) are determined by at least one of said one or more parameters associated with access to the tracking data exceeding said authorized threshold.

12. The data governance and licensing system of claim 11, wherein said at least one authorized threshold comprises a threshold selected from a group consisting of: a volumetric access threshold, a frequency access threshold, a duration access threshold, a data-type access threshold, a classification access threshold, and any combination thereof.

13. The data governance and licensing system of claim 11, wherein, in response to said quantitative data exceeding said at least one authorized threshold, said one or more computer processors are configured to generate a license proposal request.

14. The data governance and licensing system of claim 13, wherein said license proposal requests comprises a request to revise an existing license agreement previously entered into by said authorized party accessing said tracking data.

15. The data governance and licensing system of claim 14, wherein said one or more computer processors are further configured to, in response to one or more discrepancies existing, transmit a notification of said license proposal request to at least one party.

16. The data governance and licensing system of claim 15, wherein said notification is transmitted to at least one party selected from a group consisting of: the at least one accessing party, an account administrator, and a legal representative.

17. A computer program product comprising at least one non-transitory computer-readable storage medium having computer-readable program code portions embodied therein, the computer-readable program code portions comprising:
(A) a first executable portion configured for receiving a plurality of data, wherein said data comprises:
(i) tracking data related to one or more parameters associated with transport of a plurality of packages by a common carrier,
(ii) generic usage parameter data, the generic usage parameter data comprising at least one threshold associated with access to said tracking data, and the at least one threshold being based upon: (a) a volume of said access to said tracking data, (b) a duration of said access; and (c) a type of said access to said tracking data, wherein said type of said access to said tracking data, upon which the at least one threshold is based in part, comprises a determination of whether the authorized party is an external or internal party relative to said common carrier and an assessment of whether standard view information or tracking data has been accessed; and
(iii) authorized user data related to a plurality of authorized parties, the authorized parties comprising those parties authorized to access the tracking data;
(B) a second executable portion configured for analyzing at least a portion of the observed data to determine an identity of the at least one accessing party, the determined identity being stored as identification data;
(C) a third executable portion configured for comparing the identification data and the authorized user data to determine whether the at least one accessing party is an authorized party; and
(D) a fourth executable portion configured for:
i. in response to the accessing party not being an authorized party:
a) determining whether one or more discrepancies exist between the observed data and the generic usage parameter data; and
b) in response to one or more discrepancies existing, generating a license proposal request configured to govern future access to said tracking data by said at least one accessing party; and
ii. in response to the accessing party being an authorized party:
a) determining whether one or more discrepancies exist between the observed data and the authorized user data; and
b) in response to one or more discrepancies existing, generating a license revision request configured to govern future access to said tracking data by said at least one accessing party.

18. The computer program product of claim 17, wherein:
at least a portion of the observed data in (B) comprises an observed Internet Protocol address (IP address);
said authorized user data comprises one or more authorized IP addresses; and
said third executable portion is further configured for determining whether the accessing party is an authorized party based at least in part upon a comparison of said observed IP address with said one or more authorized IP addresses.

19. The computer program product of claim 17, wherein:
said observed data comprises quantitative data related to the tracking data accessed; and
said fourth executable portion is configured to determine said one or more discrepancies based at least in part upon at least one parameter within said quantitative data exceeding at least one of said thresholds.

20. The computer program product of claim 19, wherein, in response to said quantitative data exceeding at least one of said thresholds, said fourth executable portion is further configured to generate at least one of a notification and a continued monitoring request.

21. The computer program product of claim 20, wherein, in response to said quantitative data exceeding at least one of said thresholds, said fourth executable portion is further configured to transmit said notification to at least one party, said notification including at least some indicia of at least one of said license proposal request and said license revision request.

22. A computer-implemented method for managing governance and licensing of data related to transport of a plurality of packages by a common carrier and for facilitating licensing arrangements in connection therewith and between the common carrier and a plurality of authorized parties, the method comprising the steps of:
  (A) receiving and storing observed data within one or more memory storage areas, the actual data being associated with access of at least a portion of said tracking data by at least one accessing party;
  (B) analyzing at least a portion of the observed data to determine an identity of the accessing party, the determined identity being stored as identification data;
  (C) retrieving from the one or more memory storage areas at least a portion of authorized user data related to a plurality of authorized parties, the authorized parties comprising those parties authorized to access the tracking data;
  (D) comparing, via at least one computer processor, the identification data and the retrieved portion of the authorized user data to determine whether the accessing party is an authorized party;
  (E) in response to the accessing party not being an authorized party:
    i. retrieving from the one or more memory storage areas at least a portion of generic usage data, the generic usage data comprising at least one threshold associated with access to said tracking data, and the at least one threshold being based upon: (a) a volume of said access to said tracking data, (b) a duration of said access, and (c) a type of said access to said tracking data, wherein said type of said access to said tracking data, upon which the at least one threshold is based in part, comprises a determination of whether the authorized party is an external or internal party relative to said common carrier and an assessment of whether standard view information or tracking data has been accessed;
    ii. determining whether one or more discrepancies exist between the observed data and the generic usage data; and
    iii. in response to one or more discrepancies existing, generating a license proposal request configured to govern future access to said tracking data by said at least one accessing party; and
  (F) in response to the accessing party being an authorized party:
    i. retrieving from the one or more memory storage areas at least a portion of the authorized user data, the authorized user data comprising at least one threshold associated with access to said tracking data, and the at least one threshold being based upon: (a) a volume of said access to said tracking data, (b) a duration of said access, and (c) a type of said access to said tracking data, wherein said type of said access to said tracking data, upon which the at least one threshold is based in part, comprises a determination of whether the authorized party is an external or internal party relative to said common carrier and an assessment of whether standard view information or tracking data has been accessed;
    ii. determining whether one or more discrepancies exist between the observed data and the authorized user data; and
    iii. in response to one or more discrepancies existing, generating a license revision request configured to govern future access to said tracking data by said at least one accessing party.

* * * * *